US012370817B2

(12) United States Patent
Seki et al.

(10) Patent No.: US 12,370,817 B2
(45) Date of Patent: Jul. 29, 2025

(54) PROCESSING DEVICE WITH A SHEET CUTTER

(71) Applicant: Roland DG Corporation, Hamamatsu (JP)

(72) Inventors: Kenji Seki, Hamamatsu (JP); Yuichi Sugiyama, Hamamatsu (JP); Akihiro Suzuki, Hamamatsu (JP); Ryosuke Nonaka, Hamamatsu (JP)

(73) Assignee: ROLAND DG CORPORATION, Shizuoka (JP)

(*) Notice: Subject to any disclaimer, the term of this patent is extended or adjusted under 35 U.S.C. 154(b) by 157 days.

(21) Appl. No.: 18/371,585

(22) Filed: Sep. 22, 2023

(65) Prior Publication Data

US 2024/0010011 A1 Jan. 11, 2024

Related U.S. Application Data

(63) Continuation of application No. PCT/JP2022/012750, filed on Mar. 18, 2022.

(30) Foreign Application Priority Data

Mar. 23, 2021 (JP) ................................ 2021-049087
Mar. 23, 2021 (JP) ................................ 2021-049088
Feb. 10, 2022 (JP) ................................ 2022-019698

(51) Int. Cl.
*B41J 11/66* (2006.01)
*B41J 2/045* (2006.01)
(Continued)

(52) U.S. Cl.
CPC ......... *B41J 11/663* (2013.01); *B41J 2/04501* (2013.01); *B41J 11/003* (2013.01);
(Continued)

(58) Field of Classification Search
CPC ......... B41J 11/66; B41J 11/663; B41J 11/666; B41J 11/68; B41J 11/70; B41J 11/706
See application file for complete search history.

(56) References Cited

U.S. PATENT DOCUMENTS 6,302,605 B1 10/2001 Kanbe
2002/0118990 A1* 8/2002 Kwasny .................. B41J 11/70 400/621
(Continued)

FOREIGN PATENT DOCUMENTS

JP 62-153067 A 7/1987
JP 62-176861 A 8/1987
(Continued)

OTHER PUBLICATIONS

Official Communication issued in International Patent Application No. PCT/JP2022/012750, mailed on Jun. 21, 2022.

*Primary Examiner* — Scott A Richmond
(74) *Attorney, Agent, or Firm* — Keating & Bennett, LLP

(57) ABSTRACT

A processing device includes a support table to support a sheet medium, a sheet cutter to cut the medium supported on the support table, a cutter holder to move the sheet cutter in a toward-away direction in which the sheet cutter moves toward and away from the support table, and a cutter transporter to move the cutter holder in a cutting direction that is orthogonal to a transport direction of the medium. The cutter holder includes a holder movable in the toward-away direction and that holds the sheet cutter, an actuator including a rod that extends or retracts, a link connected to the rod and the holder, and a rotation shaft that rotatably supports the link so that the holder moves in the toward-away direction in response to extension or retraction of the rod.

22 Claims, 19 Drawing Sheets

(51) Int. Cl.

| | |
|---|---|
| ***B41J 11/00*** | (2006.01) |
| ***B41J 11/42*** | (2006.01) |
| ***B41J 11/70*** | (2006.01) |
| ***B41J 15/02*** | (2006.01) |
| ***B41J 15/04*** | (2006.01) |
| ***B65H 35/06*** | (2006.01) |

(52) U.S. Cl.

CPC .............. *B41J 11/42* (2013.01); *B41J 11/706* (2013.01); *B41J 15/02* (2013.01); *B41J 15/04* (2013.01); *B65H 35/06* (2013.01); *B65H 2301/51512* (2013.01); *B65H 2701/11312* (2013.01)

(56) References Cited

U.S. PATENT DOCUMENTS

| | | | | |
|---|---|---|---|---|
| 2019/0299670 | A1* | 10/2019 | Mizutani | B26D 1/305 |
| 2020/0171858 | A1* | 6/2020 | Igarashi | B41J 11/706 |

FOREIGN PATENT DOCUMENTS

| | | | |
|---|---|---|---|
| JP | 01-146688 | A | 6/1989 |
| JP | 02-124294 | A | 5/1990 |
| JP | 10-16331 | A | 1/1998 |
| JP | 2000-296496 | A | 10/2000 |
| JP | 2004-181825 | A | 7/2004 |
| JP | 2018-002479 | A | 1/2018 |

* cited by examiner

PROCESSING DEVICE WITH A SHEET CUTTER

CROSS REFERENCE TO RELATED APPLICATIONS

This application claims the benefit of priority to Japanese Patent Application No. 2021-049087 filed on Mar. 23, 2021, Japanese Patent Application No. 2021-049088 filed on Mar. 23, 2021, Japanese Patent Application No. 2022-019698 filed on Feb. 10, 2022 and is a Continuation application of PCT Application No. PCT/JP2022/012750 filed on Mar. 18, 2022. The entire contents of each application are hereby incorporated herein by reference.

BACKGROUND OF THE INVENTION

1. Field of the Invention

The present invention relates to a processing device with a sheet cutter.

2. Description of the Related Art

A device with a sheet cutter for cutting a sheet after processing, e.g., printing on, a sheet medium has been known in the art. For example, JP A 2018-2479 discloses an inkjet printer including a sheet transport section that transports a roll medium such as a roll paper, a recording head that forms an image on the medium, and a sheet cutter that cuts the medium to a predetermined length after forming an image thereon.

The sheet cutter of the inkjet printer disclosed in JP A 2018-2479 includes a pair of circular blades that rotate and travel in the width direction of the medium, and the medium is cut by rotating the pair of blades. The pair of circular blades are arranged so as to oppose each other with the medium therebetween.

SUMMARY OF THE INVENTION

With a sheet cutter that rotates and travels circular blades as described in JP A 2018-2479, if intermittent sheet cutting (so-called perforation) is to be performed, for example, it is necessary to change the circular blades to one in which teeth are formed intermittently along the circumference. As described above, the sheet cutter of the configuration as disclosed in JP A 2018-2479 is not configured to flexibly accommodate various types of cutting.

Preferred embodiments of the present invention provide processing devices that can flexibly accommodate various types of cutting.

A processing device includes a support table to support a sheet medium, a medium transporter to transport the medium supported on the support table in a predetermined transport direction, a processing head to process the medium supported on the support table, a sheet cutter that includes a blade portion at a tip to cut the medium, a cutter holder to hold and move the sheet cutter in a predetermined toward-away direction so as to move the blade portion of the sheet cutter into contact with or away from the medium supported on the support table, and a cutter transporter to move the cutter holder in a cutting direction that is orthogonal to the transport direction; wherein the cutter holder includes a holder that is movable in the toward-away direction and that holds the sheet cutter, an actuator including a rod that extends or retracts, a link including a first connecting portion connected to the rod and a second connecting portion connected to the holder, and a rotation shaft that rotatably supports the link so that the holder moves in the toward-away direction in response to extension or retraction of the rod.

According to a processing device according to a preferred embodiment of the present invention, with the cutter holder including the actuator and the link, it is possible to freely move the sheet cutter into contact with or away from the medium, and with the cutter moving device, it is possible to move the sheet cutter in the cutting direction. Therefore, by combining the movement of the cutter holder and the movement of the cutter transporter, it is possible to flexibly accommodate various types of cutting.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
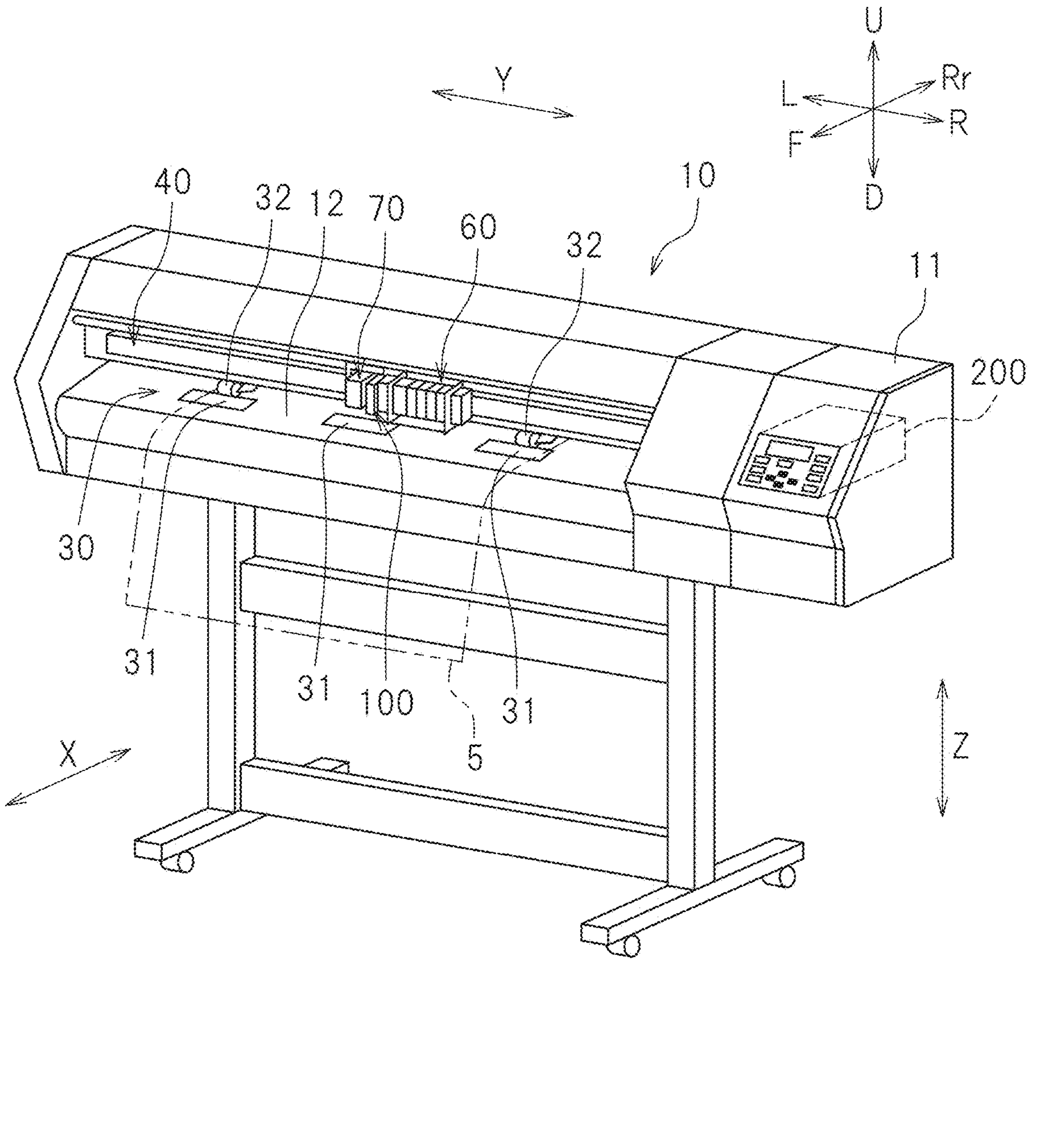
FIG. 1 is a perspective view of a printer with a cutting head according to a first preferred embodiment of the present invention.
Figure 2:
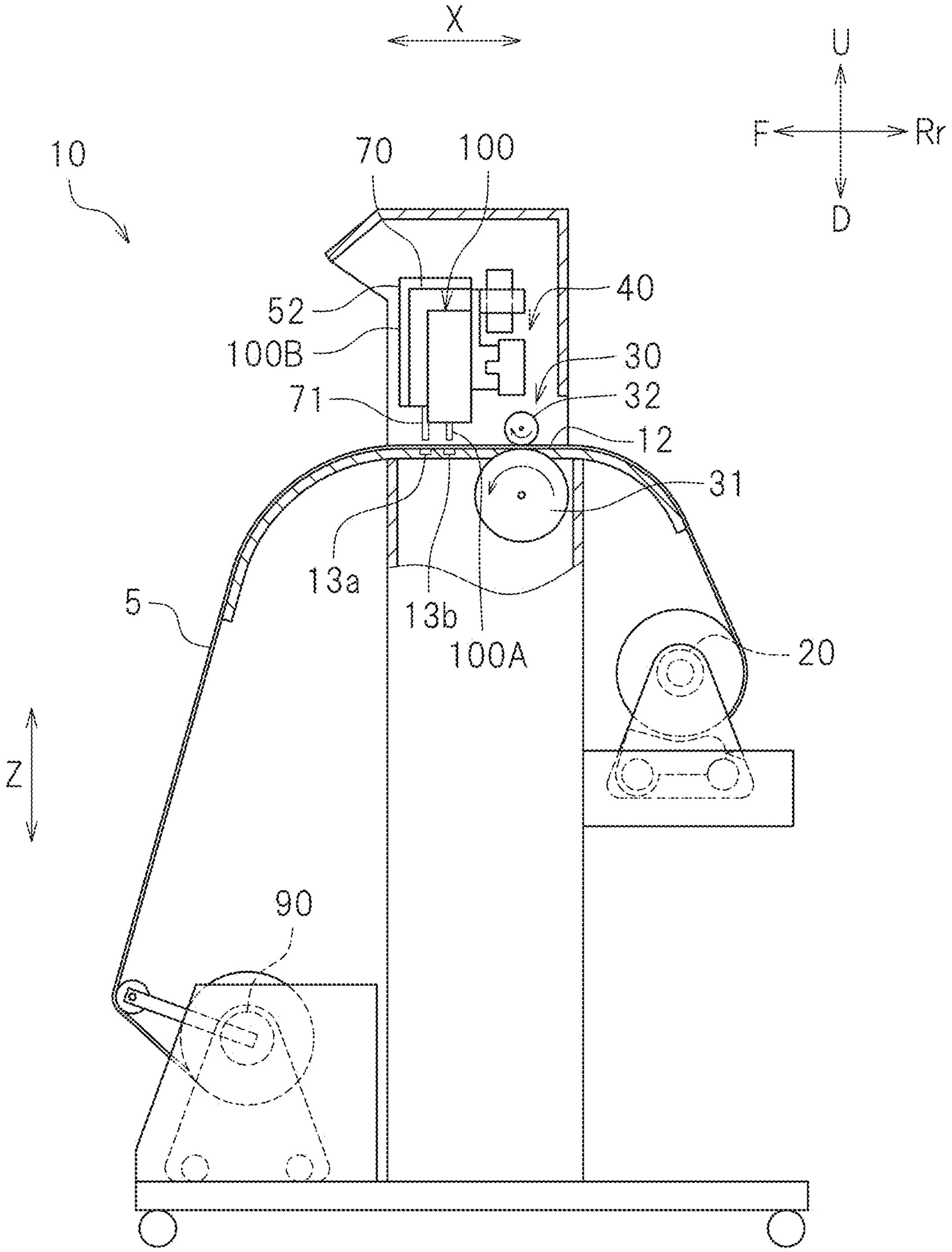
FIG. 2 is a schematic, partially broken right side view of the printer with a cutting head.

Preferred embodiments of the present invention will now be described with reference to the drawings. FIG. 1 is a perspective view of an inkjet printer 10 (hereinafter the printer 10) with a cutting head according to the present preferred embodiment. FIG. 2 is a schematic, partially broken right side view of the main portion of the printer 10. As shown in FIG. 1 and FIG. 2, the printer 10 according to the present preferred embodiment is a device for printing on and cutting a sheet medium 5. The medium 5 may be, for example, a seal material including a backing paper and a release paper layered on the backing paper and coated with an adhesive, or it may be a recording paper or a sheet made of a resin. There is no particular limitation on the medium 5 as long as at least one of printing and cutting can be done.

As used herein, "cutting" includes the case where the entirety of the medium 5 in the thickness direction is cut (e.g., cutting both the backing paper and the release paper of the seal material) and the case where a portion of the medium 5 in the thickness direction (e.g., cutting only the release paper but not the backing paper of the seal material). In addition, as used herein "cutting" includes the case where the medium 5 is cut continuously (hereinafter also referred to as continuous cutting) and the case where the medium 5 is cut intermittently (hereinafter also referred to as perforation).

The printer 10 includes a main body 11, a supply roller 20 (not shown in FIG. 1; see FIG. 2) that supplies the sheet medium 5, a platen 12 provided on the main body 11 that supports the medium 5, a transport device 30 that transports the medium 5 supported by the platen 12 in a predetermined transport direction, a print head 60 that prints on the medium 5, a cutting head 70 that cuts the medium 5, a head moving device 40 that moves the print head 60 and the cutting head 70, a take-up roller 90 that takes up the medium 5 (not shown in FIG. 1; see FIG. 2), a sheet cutter unit that cuts the medium 5 after printing and cutting are completed, and a control device 200.

As will be described in detail later, the print head 60 and the cutting head 70 are configured to be movable in the Y direction shown in the figures. The medium 5 is transported in the X direction shown in the figures. The Y direction is also referred to as the primary scanning direction, and the X direction as the sub-scanning direction. The primary scanning direction Y is herein the left-right direction. The primary scanning direction Y is also the cutting direction in which the sheet cutter unit 100 cuts the medium 5. The sub-scanning direction X is herein the front-rear direction. The sub-scanning direction X is the transport direction in which the transport device 30 transports the medium 5. The primary scanning direction Y (cutting direction) and the sub-scanning direction X (transport direction) are orthogonal to each other. As used herein, forward refers to forward of the printer 10. Rearward refers to rearward of the printer 10. Note that the primary scanning direction Y corresponds to the width direction of the medium 5, and the sub-scanning direction X corresponds to the longitudinal direction of the medium 5. Reference signs F, Rr, L, R, U and D in the figures refer to front, rear, left, right, up and down, respectively.

Figure 12:
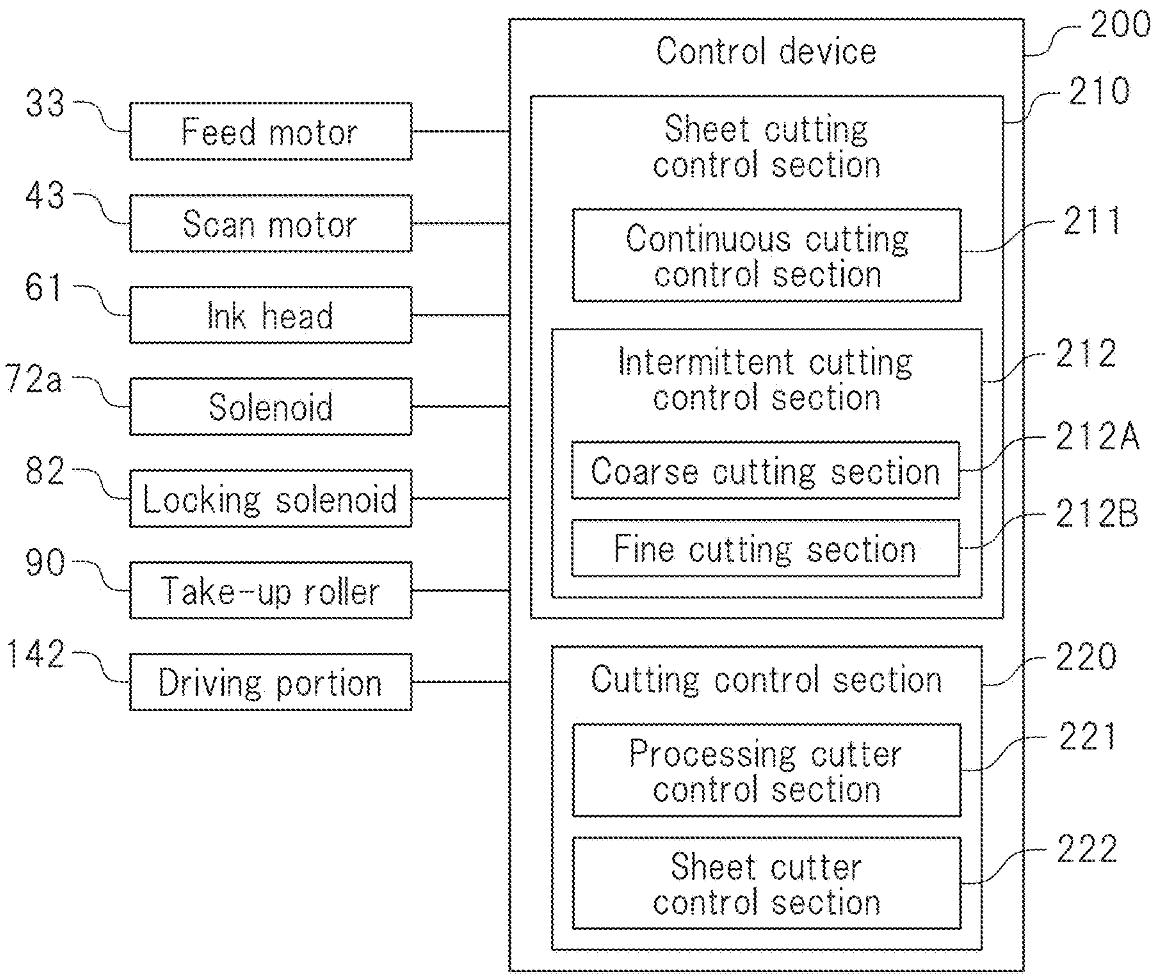
FIG. 12 is a block diagram of a printer with a cutting head.

As shown in FIG. 1, the transport device 30 includes grit rollers 31, pinch rollers 32 and a feed motor 33 (see FIG. 12). The grit rollers 31 are provided on the platen 12. The grit rollers 31 rotate when driven by the feed motor 33. The pinch rollers 32 are arranged upward of the grit rollers 31. The pinch rollers 32 are provided so as to oppose the grit rollers 31. The pinch rollers 32 are configured so that the pinch rollers 32 can swing up and down so that the pinch rollers 32 can move toward and away from the grit rollers 31. When the grit rollers 31 rotate with the medium 5 sandwiched between the pinch rollers 32 and the grit rollers 31, the medium 5 is transported forward or rearward. Note that while only three grit rollers 31 and two pinch rollers 32 are illustrated in FIG. 1, more grit rollers 31 and more pinch rollers 32 may be arranged in practice in the primary scanning direction Y. The feed motor 33 is electrically connected to the control device 200 and is controlled by the control device 200.

Figure 3:
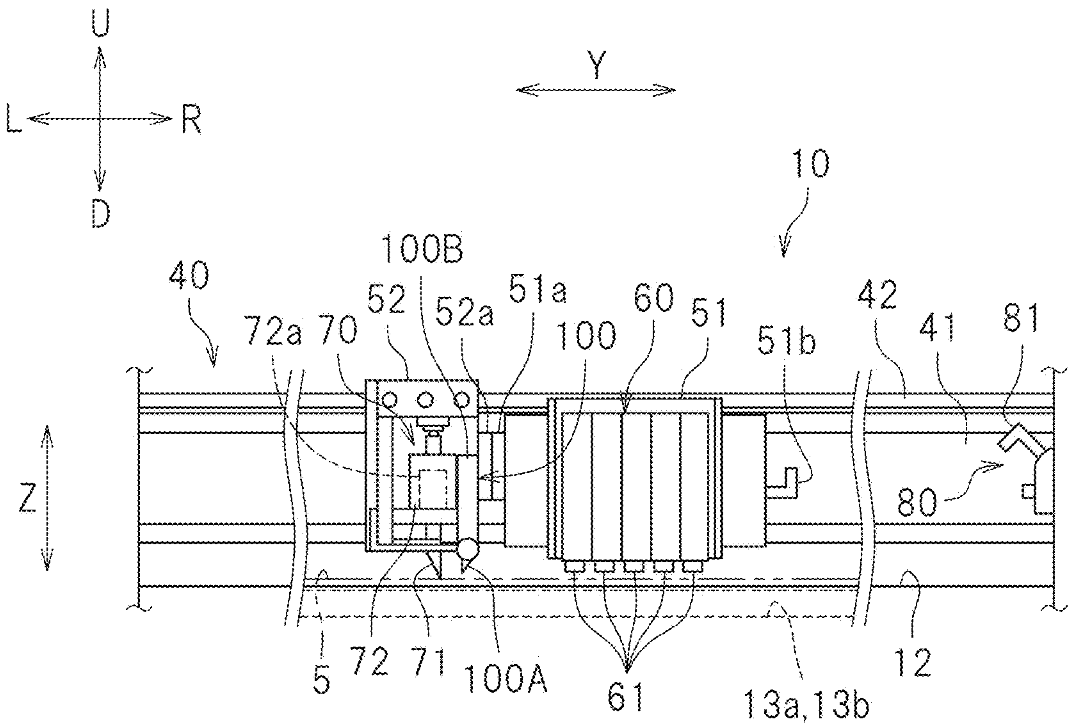
FIG. 3 is a front view of the print head and the cutting head with the first carriage and the second carriage linked together.
Figure 4:
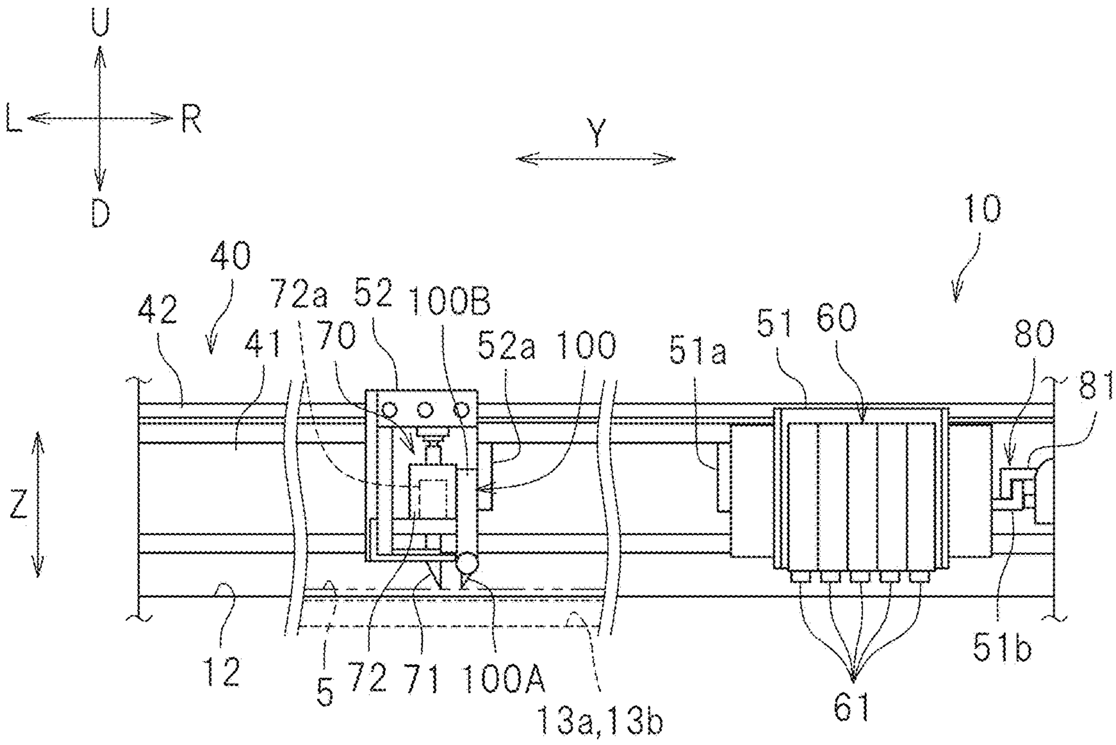
FIG. 4 is a front view of the print head and the cutting head with the first carriage and the second carriage separated from each other.

FIG. 3 and FIG. 4 are front views of the print head 60 and the cutting head 70. FIG. 3, of the two, shows a state where the first carriage 51 and the second carriage 52 are linked together. FIG. 4 shows a state where the first carriage 51 and the second carriage 52 are separated from each other. The head moving device 40 is configured to move the first carriage 51, which holds the print head 60, and the second carriage 52, which holds the cutting head 70, in the primary scanning direction Y. Where the first carriage 51 and the second carriage 52 are linked together, the head moving device 40 moves the first carriage 51 and the second carriage 52 as one unit. Where the first carriage 51 and the second carriage 52 are separated from each other, the head moving device 40 independently moves only the second carriage 52. As will be described in detail later, the second carriage 52 includes the sheet cutter unit 100. The head moving device 40 moves the print head 60 and the cutting head 70 in the primary scanning direction Y and is also a cutter moving device that moves the sheet cutter unit 100 in the primary scanning direction Y.

As shown in FIG. 3 and FIG. 4, the head moving device 40 includes a guide rail 41, a belt 42, and a scan motor 43 (see FIG. 12). The guide rail 41 is located upward of the platen 12. The guide rail 41 extends in the primary scanning direction Y. The first carriage 51 and the second carriage 52 are slidably engaged with the guide rail 41. The belt 42 extending in the primary scanning direction Y is fixed to an upper portion of the back surface of the second carriage 52. The belt 42 is connected to the scan motor 43. When the scan motor 43 rotates, the belt 42 runs in the primary scanning direction Y. This causes the second carriage 52 to move in the primary scanning direction Y. The scan motor 43 is electrically connected to the control device 200 and controlled by the controller 200.

The first carriage 51 and the second carriage 52 are linked together or separated from each other by linkage members 51*a* and 52*a*. As shown in FIG. 3 and FIG. 4, the linkage members 51*a* and 52*a* include the first linkage member 51*a* provided on the first carriage 51, and the second linkage member 52*a* provided on the second carriage 52. The first linkage member 51*a* is provided on the left side portion of the first carriage 51. The second linkage member 52*a* is provided on the right side portion of the second carriage 52. In the present preferred embodiment, the linkage members 51*a* and 52*a* link together the first carriage 51 and the second carriage 52 by using a magnetic force. One of the first linkage member 51*a* and the second linkage member 52*a* includes a magnet, and the other includes a magnetic material that is attracted to a magnet. Note however that the linkage members 51*a* and 52*a* are not limited to those using a magnetic force, but may include other elements such as engaging portions. The first carriage 51 and the second carriage 52 are linked together by contact between the first linkage member 51*a* and the second linkage member 52*a*.

An L-shaped receiving fitting 51*b* is provided on the right side of the first carriage 51. A lock device 80 to secure the first carriage 51 is provided near the right end of the guide rail 41. The lock device 80 includes a hook 81 that is hooked to the receiving fitting 51*b*, and a locking solenoid 82 (see FIG. 12) that moves the hook 81 between the locked position (see FIG. 4) and the non-locked position (see FIG. 3). The locking solenoid 82 is electrically connected to the control device 200 and controlled by the control device 200.

As shown in FIG. 3, when printing with the print head 60, the hook 81 is set to the non-locked position. When the second carriage 52 moves rightward and the first linkage member 51*a* and the second linkage member 52*a* come into contact with each other, the second carriage 52 and the first carriage 51 are linked together. As a result, the first carriage 51 can move in the primary scanning direction Y together with the second carriage 52. With the first carriage 51 and the second carriage 52 linked together, the head moving device 40 moves the print head 60 and the cutting head 70 in the primary scanning direction Y.

During cutting by the cutting head 70, as shown in FIG. 4, the first carriage 51 is positioned in the standby position at the right end of the movable range and the hook 81 of the lock device 80 is set in the locked position. This prevents the movement of the first carriage 51. When the second carriage 52 moves leftward in this state, the first linkage member 51*a* and the second linkage member 52*a* move away from each other, thereby releasing the link between the second carriage 52 and the first carriage 51. As a result, in the state where the first carriage 51 is standing by in the standby position, the second carriage 52 can move in the primary scanning direction Y.

The first carriage 51 holds the print head 60. The print head 60 prints on the medium 5 by ejecting ink toward the medium 5 supported on the platen 12. Printing is an example processing on the medium 5, and the print head 60 is an example processing head that processes the medium 5. The print head 60 includes a plurality of ink heads 61. A plurality of nozzles (not shown) to eject ink are formed on the lower surface of the plurality of ink heads 61. There is no particular limitation on the quantity of ink heads 61, and there is no limitation on the type and color of ink ejected by the ink heads 61.

The second carriage 52 holds the cutting head 70 and the sheet cutter unit 100. Cutting is an example processing on the medium 5, and the cutting head 70 is also an example processing head that processes the medium 5. The cutting head 70 includes a processing cutter 71 and a processing cutter holding device 72. The processing cutter 71 is a cutter that cuts the medium 5 supported on the platen 12 based on cut data that is included in processing data. The processing data includes at least one of the print data and the cut data. The processing cutter holding device 72 moves the processing cutter 71 in the up-down direction Z so as to move the processing cutter 71 into contact with or away from the medium 5 on the platen 12. The up-down direction Z herein is the toward-away direction of the processing cutter 71 relative to the platen 12. The downward direction of the up-down direction Z is the direction in which the processing cutter 71 moves toward the medium 5. The upward direction of the up-down direction Z is the direction in which the processing cutter 71 moves away from the medium 5. The up-down direction Z is orthogonal to the primary scanning direction Y and the sub-scanning direction X. Note however that the toward-away direction of the processing cutter 71 can be any direction that intersects the primary scanning direction Y and the sub-scanning direction X, and it does not have to be the up-down direction Z.

The processing cutter holding device 72 includes a solenoid 72*a* that moves the processing cutter 71 in the up-down direction Z. When the solenoid 72*a* is turned ON/OFF, the processing cutter 71 moves in the up-down direction Z so as to move into contact with or away from the medium 5. The processing cutter 71 can cut the medium 5 by contacting the medium 5. The solenoid 72*a* is electrically connected to the control device 200 and controlled by the control device 200.

As shown in FIG. 2, the printer 10 includes the supply roller 20 on which the medium 5 prior to printing is wound. The supply roller 20 is arranged diagonally rearward and downward of the platen 12. During printing or cutting, the medium 5 wound on the supply roller 20 is moved in the sub-scanning direction X via the platen 12. The take-up roller 90 is configured to take up the printed and cut medium 5 into a roll. As shown in FIG. 2, the take-up roller 90 is arranged diagonally forward and downward of the platen 12.

The sheet cutter unit 100 perforates or continuously cuts the printed and cut medium 5 in the primary scanning direction Y. As shown in FIG. 2, the sheet cutter unit 100 is mounted on the second carriage 52 and moved in the primary scanning direction Y by the head moving device 40 as the cutter moving device. In the second carriage 52, the sheet cutter unit 100 is provided upstream (rearward Rr) in the sub-scanning direction X relative to the cutting head 70.

Figure 5:
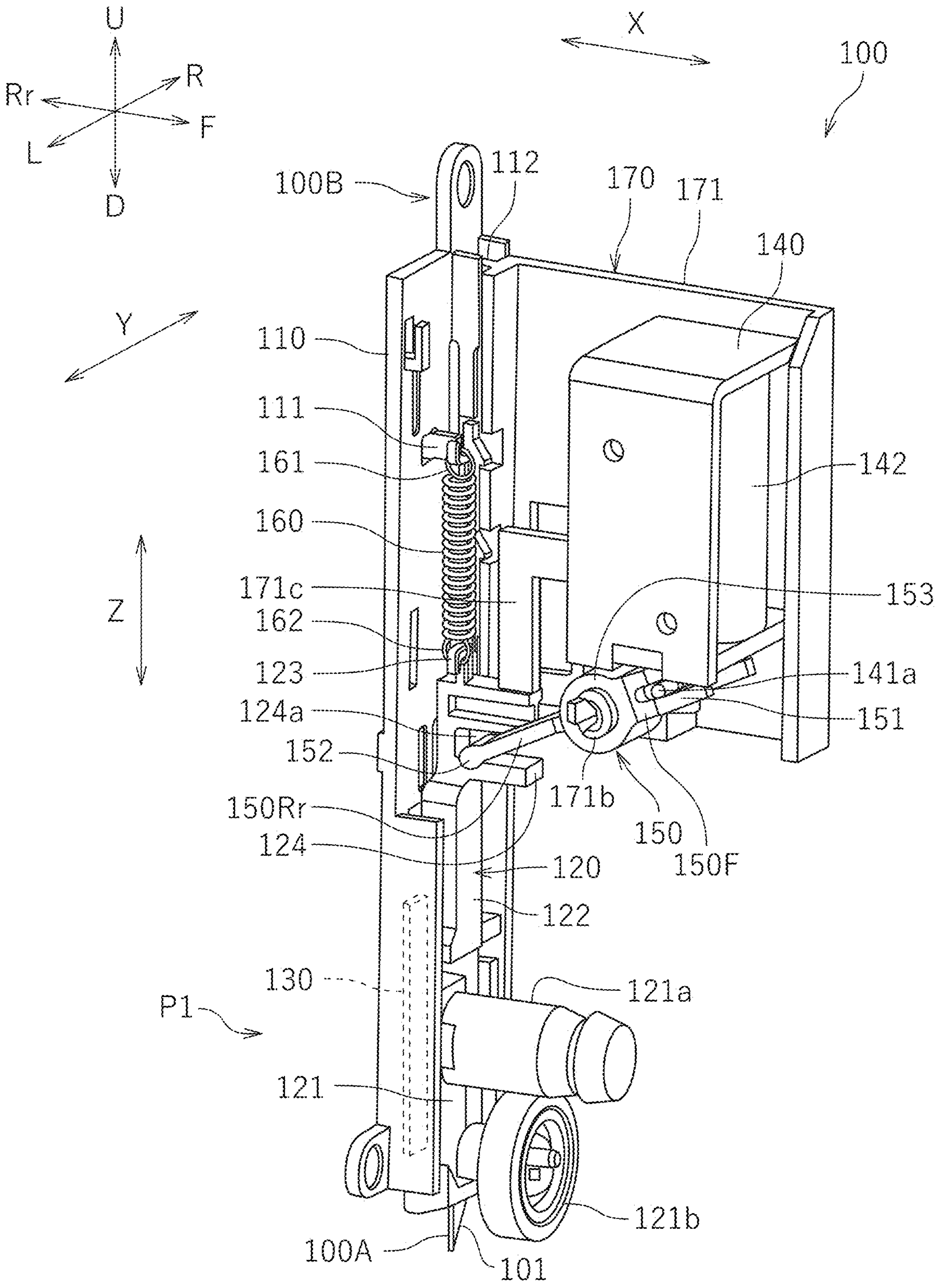
FIG. 5 is a perspective view of a sheet cutter unit.
Figure 6:
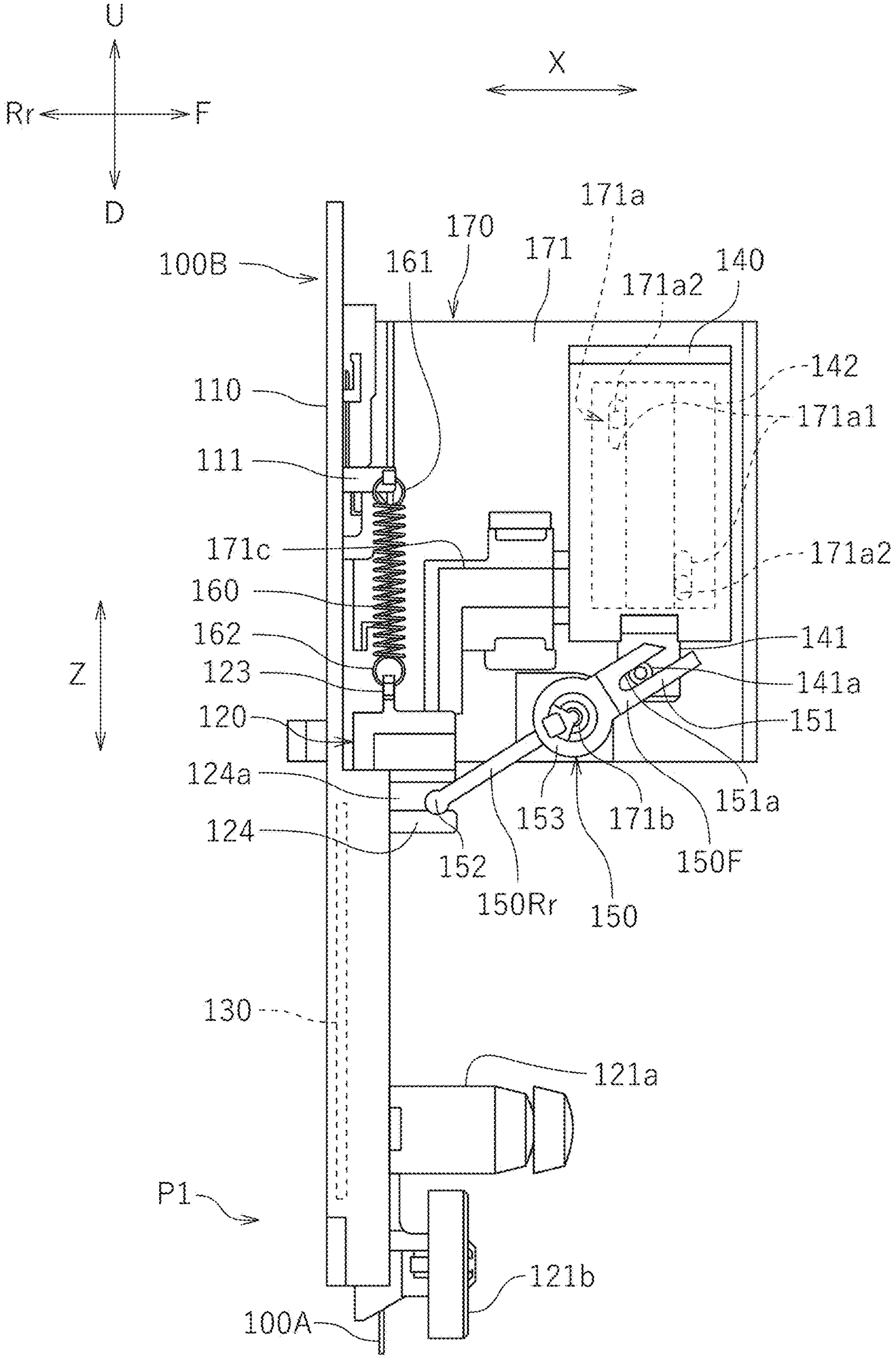
FIG. 6 is a left side view of the sheet cutter unit.
Figure 7:
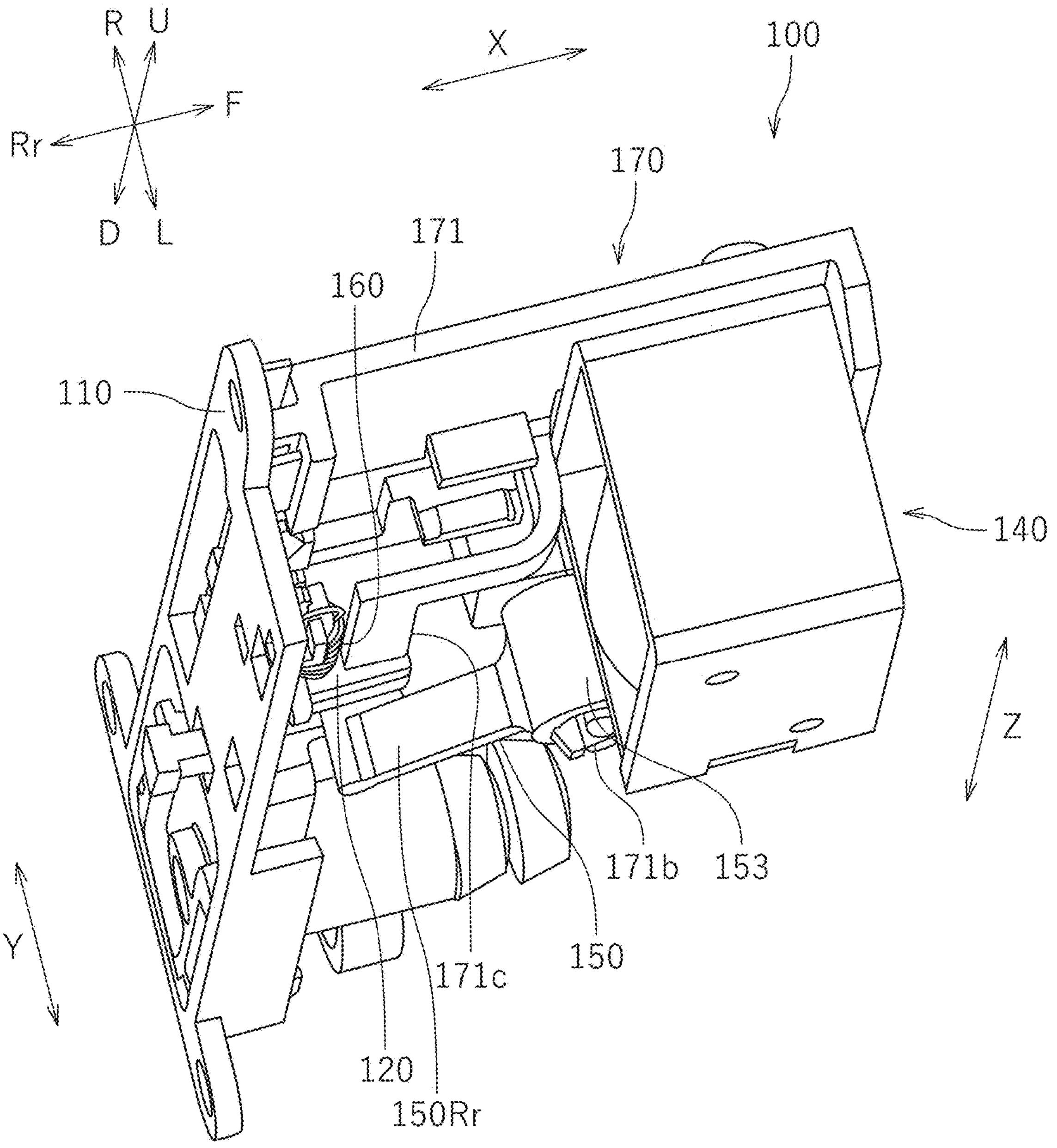
FIG. 7 is a perspective view of the sheet cutter unit without the cover not attached thereto as viewed from above.

FIG. 5 is a perspective view of the sheet cutter unit 100 as viewed from a diagonally leftward direction. FIG. 6 is a left side view of the sheet cutter unit 100. FIG. 7 is a perspective view of the sheet cutter unit 100 as viewed from a diagonally upward direction. FIG. 5 to FIG. 7 are views showing a state where a cover 172 (see FIG. 8 to be discussed below) of a case 170 is removed. As shown in FIG. 5 and FIG. 6, the sheet cutter unit 100 includes a sheet cutter 100A that cuts the medium 5 supported on the platen 12, and a sheet cutter holding device 100B that holds the sheet cutter 100A. The sheet cutter holding device 100B is configured to hold the sheet cutter 100A and move the sheet cutter 100A toward and away from the platen 12 in the toward-away direction. The toward-away direction of the sheet cutter 100A is herein the up-down direction Z. The downward direction of the up-down direction Z is the move-toward direction in which the sheet cutter 100A moves toward the medium 5. The upward direction of the up-down direction Z is the move-away direction in which the sheet cutter 100A moves away from the medium 5. Note however that the toward-away direction of the sheet cutter 100A does not need to be the up-down direction Z but may be any direction that intersects the primary scanning direction Y and the sub-scanning direction X. While the toward-away direction of the sheet cutter 100A and the toward-away direction of the processing cutter 71 coincide with each other in the present preferred embodiment, they do not need to coincide with each other. Note that FIG. 5 to FIG. 7 are views showing the sheet cutter unit 100 with the sheet cutter 100A lowered to the lowest position.

As shown in FIG. 5, the sheet cutter 100A is a plate-shaped cutter extending in the up-down direction Z. The sheet cutter 100A includes a blade portion 101 at its tip and cuts the medium 5 with the blade portion 101. The sheet cutter 100A is fixed to the sheet cutter holding device 100B so that the sheet cutter 100A itself cannot rotate or move.

The sheet cutter 100A is located upstream (rearward Rr) in the sub-scanning direction X relative to the print head 60 and the cutting head 70.

The sheet cutter holding device 100B holds and moves the sheet cutter 100A in the toward-away direction (the up-down direction Z) to move the blade portion 101 of the sheet cutter 100A into contact with or away from the medium 5 supported on the platen 12. As shown in FIG. 5, the sheet cutter retainer 100B includes a frame member 110, a holder 120 that holds the sheet cutter 100A, a slide guide 130 that supports the holder 120 so that the holder 120 can slide in the up-down direction Z, an actuator 140 that generates a driving force to slide the holder 120, a link member 150 that transmits the driving force of the actuator 140 to the holder 120, a spring 160 that pulls up the holder 120, and a case 170 attached to the frame member 110. FIG. 5 to FIG. 7 illustrate a side plate 171 of the case 170 attached to the frame member 110.

The frame member 110 is fixed to the second carriage 52 and supports the slide guide 130 and a side plate 171 of the case 170. As will be described in detail below, the frame member 110 directly or indirectly supports all other members of the sheet cutter holding device 100B. As shown in FIG. 5, the frame member 110 is herein formed in a flat plate shape extending in the up-down direction Z and the primary scanning direction Y. The slide guide 130 is provided in a lower portion of the front surface of the frame member 110. The slide guide 130 herein includes a pair of guide rails extending in the up-down direction Z. The frame member 110 includes a spring stop 111 to which the spring 160 is engaged and a case mounting portion 112 to which the side plate 171 of the case 170 is attached. The spring stop 111 is provided upward of the slide guide 130. The case mounting portion 112 is provided in a portion of the right edge of the frame member 110 that is upward relative to the slide guide 130. The side plate 171 of the case 170 is attached to the case mounting portion 112 so that it is located forward relative to the frame member 110.

The holder 120 is a member that holds the sheet cutter 100A and is configured so that the holder 120 is movable in the up-down direction Z along the slide guide 130. The holder 120 is engaged with the slide guide 130 so that the holder 120 can slide in the up-down direction. As shown in FIG. 5, the holder 120 includes a cutter holder 121, a slider 122, a spring stop 123, and a link connecting portion 124. The slider 122 is engaged with the slide guide 130 so that the slider 122 is slidable in the up-down direction Z. The cutter holder 121 is configured so that the cutter holder 121 can hold the sheet cutter 100A and can be removable from the slider 122. The cutter holder 121 is configured so that the cutter holder 121 can be attached to and detached from the lower end of the slider 122, and is arranged downward relative to the slider 122. The cutter holder 121 forms the lower end of the holder 120. The user can easily replace the sheet cutter 100A by removing the cutter holder 121 from the slider 122. The cutter holder 121 includes a cutter fixing portion 121*a* and a roller 121*b*. The cutter fixing portion 121*a* is configured so that the sheet cutter 100A can be tightened to be fixed thereto and so that the sheet cutter 100A can be loosened to be released therefrom. The roller 121*b* is provided so that the lower end thereof is located slightly higher than the tip of the sheet cutter 100A. The roller 121*b* includes a rotation shaft extending in the sub-scanning direction X and is rotatable in the primary scanning direction Y. The roller 121*b* contacts the medium 5 when the sheet cutter unit 100 moves in the primary scanning direction Y and prevents the medium 5 from floating.

The spring stop 123 is provided at the upper end of the slider 122. The link connecting portion 124 is provided at a portion of the slider 122 that is downward relative to the spring stop 123. The link connecting portion 124 is herein configured in a C-letter shape that is open toward the front side. One of the end portions of the link member 150 (a second connecting portion 152 to be described below) is inserted into a link groove 124*a* that forms a C-shaped depression of the link connecting portion 124.

The spring 160 is held in a pulled state between the spring stop 111 of the frame member 110 and the spring stop 123 of the slider 122. An upper end hook 161 of the spring 160 is hooked to the spring stop 111 of the frame member 110. A lower end hook 162 of the spring 160 is hooked to the spring stop 123 of the holder 120. The spring 160 is biasing the holder 120 upward by the restoring force thereof. The spring 160 biases the holder 120 in such a direction that the holder 120 moves away from the platen 12. Where the actuator 140 is not driving, the spring 160 suspends the holder 120 so that the sheet cutter 100A is located upward relative to the platen 12.

As shown in FIG. 5, the case 170 includes the side plate 171 supported by the frame member 110. The side plate 171 is made of a resin, for example. The side plate 171 is attached to the case mounting portion 112 of the frame member 110. The side plate 171 is located rightward relative to the most of the frame member 110 and the holder 120. The side plate 171 is a member having a flat plate shape extending in the sub-scanning direction X and the up-down direction Z. The side plate 171 extends forward from the frame member 110. The side plate 171 includes an actuator mounting portion 171*a* (see FIG. 6) to which the actuator 140 is attached, and a rotation shaft 171*b* of the link member 150. Moreover, the side plate 171 includes an arm 171*c* extending leftward from the left side surface thereof and further extending downward, as shown in FIG. 7.

As shown in FIG. 6, the actuator mounting portion 171*a* is provided on a forward portion of the side plate 171. The actuator mounting portion 171*a* includes a long hole 171*a*1 extending in the up-down direction Z and a fixing member 171*a*2 inserted through the long hole 171*a*1. The long hole 171*a*1 runs through the side plate 171 in the primary scanning direction Y. The fixing member 171*a*2 is a screw fastened to the actuator 140, for example. The actuator 140 can be moved in the up-down direction along the long hole 171*a*1 by loosening the fastening of the fixing member 171*a*2. The long hole 171*a*1 is an example of a slide portion capable of adjusting the position of the actuator 140 in the up-down direction Z. The fixing member 171*a*2 is an example of a fixing portion that fixes the position of the actuator 140 on the side plate 171 adjusted by the long hole 171*a*1 as a slide portion. The actuator mounting portion 171*a* is configured so that it is possible to adjust the position of the actuator 140 in the up-down direction Z. When the actuator 140 is attached to the side plate 171, the position of the actuator 140 in the up-down direction Z is adjusted by the actuator mounting portion 171*a* as a position adjusting portion, and the actuator 140 is then fixed to the side plate 171. The operation of adjusting the position the actuator 140 in the up-down direction will be described below. Note that the configuration for adjusting the position of the actuator 140 in the up-down direction Z is not limited to a long hole and a screw.

The rotation shaft 171*b* of the link member 150 is provided on the left side surface of the side plate 171. As shown in FIG. 6, the rotation shaft 171*b* is arranged downward relative to the actuator mounting portion 171*a* and closer to the frame member 110. The rotation shaft 171b extends leftward from the left side face of the side plate 171. A bearing portion 153 of the link member 150 is attached to the rotation shaft 171b. The rotation shaft 171b supports the link member 150 so that it can rotate around the rotation shaft 171b.

As shown in FIG. 5, the actuator 140 is attached to the side plate 171 so that the actuator 140 abuts against the left side of the side plate 171. The link member 150 is attached to the rotation shaft 171b so as to be located downward of the actuator 140. The actuator 140, the link member 150, the holder 120 and the spring 160 are all arranged leftward relative to the left side surface of the side plate 171. The left side of the side plate 171 is the inner side of the case 170 as viewed from the side plate 171. The left side surface of the side plate 171 is the inner side surface of the case 170.

The arm 171c is located upward of the holder 120 and is in contact with the upper surface of the holder 120 when the cover 172 is not attached to the side plate 171. As shown in FIG. 7, the arm 171c extends from the left side surface of the side plate 171 toward the left side, and is bent therefrom toward the rear side. The arm 171c is further bent therefrom toward the lower side. The lower surface of a portion of the arm 171c that extends downward is in contact with the upper surface of the holder 120. When the cover 172 is not attached to the side plate 171, the arm 171c restricts the holder 120 from moving upward by the biasing of the spring 160. The position of the holder 120 in the up-down direction Z when it abuts against the arm 171c, shown in FIG. 5 to FIG. 7, will also be referred to as the down position P1. As will be described in detail below, a down position P1 is the lowest position of the holder 120 when the printer 10 is in use. The arm 171c holds the holder 120 in a down position P1 resisting the biasing force of the spring 160 when the cover 172 is not attached to the side plate 171. The arm 171c is in contact with the holder 120 when the cover 172 is not attached to the side plate 171 and the holder 120 is located in the down position P1.

As shown in FIG. 5, when the cover 172 is not attached to the side plate 171, the holder 120 cannot move upward relative to the down position P1 because the upward movement thereof is restricted by the arm 171c. However, as the cover 172 is attached to the side plate 171, the arm 171c moves away from the holder 120. This allows the holder 120 to move upward relative to the down position P1. How the arm 171c moves away from the holder 120 as the cover 172 is attached to the side plate 171 will now be described in conjunction with the configuration of the cover 172.

Figure 8:
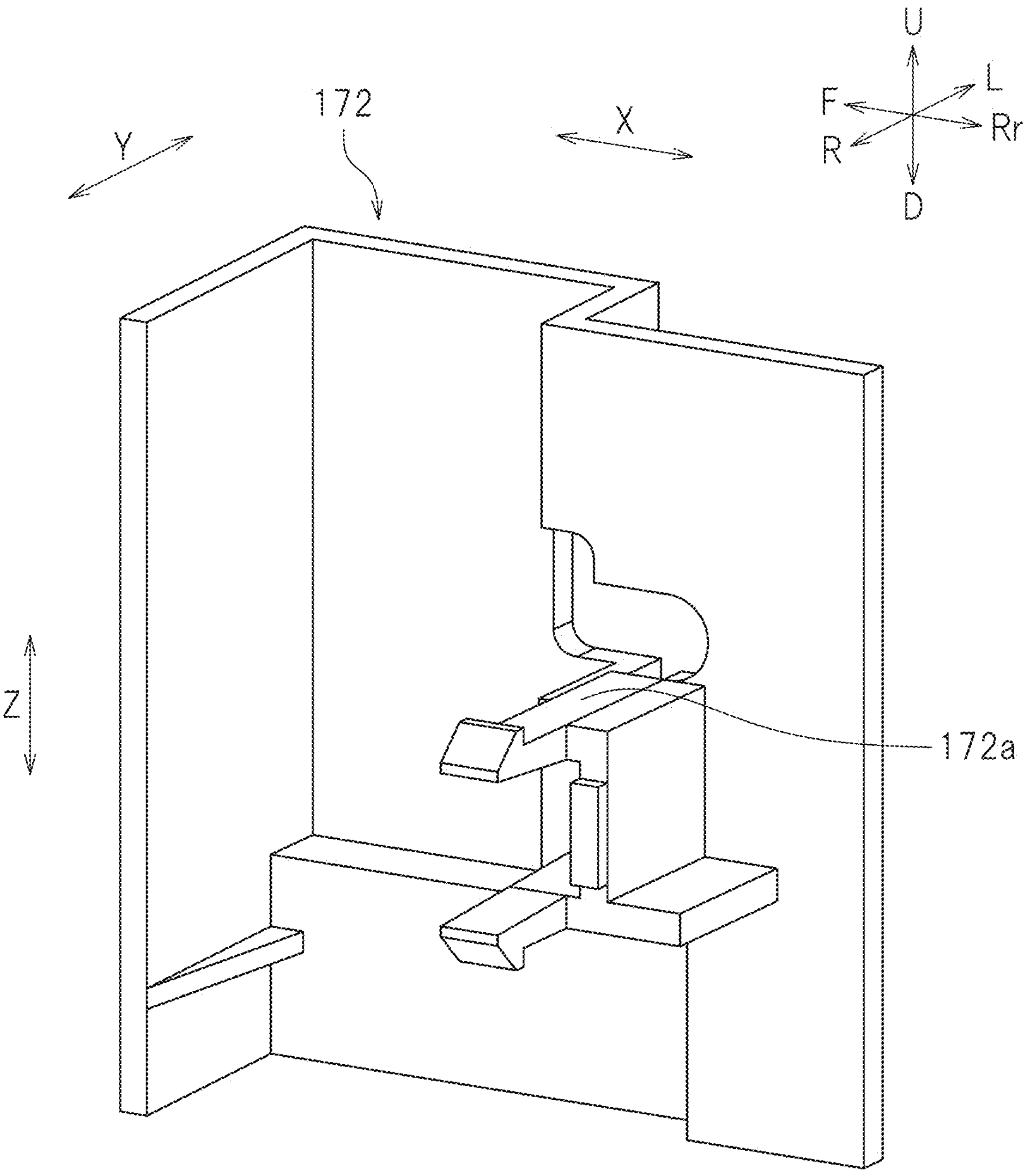
FIG. 8 is a perspective view of the cover as viewed from a diagonally rightward direction.
Figure 9:
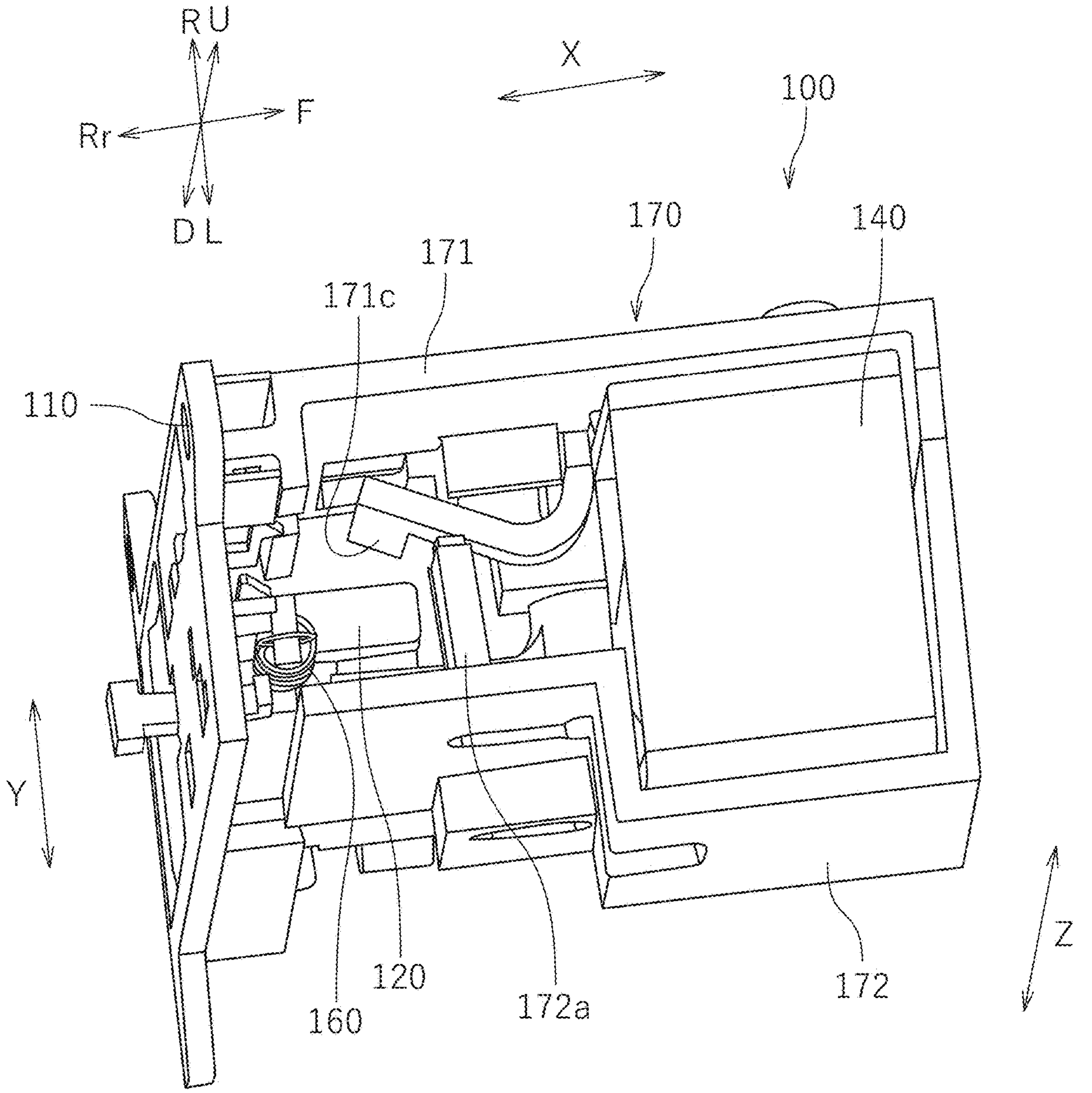
FIG. 9 is a perspective view of the sheet cutter unit with the cover attached thereto as viewed from a diagonally upper direction.

FIG. 8 is a perspective view of the cover 172 as viewed from a diagonally rightward direction. FIG. 9 is a perspective view of the sheet cutter unit 100 with the cover 172 attached thereto as viewed from a diagonally upper direction. As shown in FIG. 9, the cover 172 is attached to the side plate 171 from the left side. As shown in FIG. 9, the side plate 171 and the cover 172 together form the case 170 as the cover 172 is attached to the side plate 171. The case 170 accommodates the actuator 140, the link member 150 (see FIG. 5), the rotation shaft 171b of the link member 150 (see FIG. 5), and the spring 160.

Figure 10:
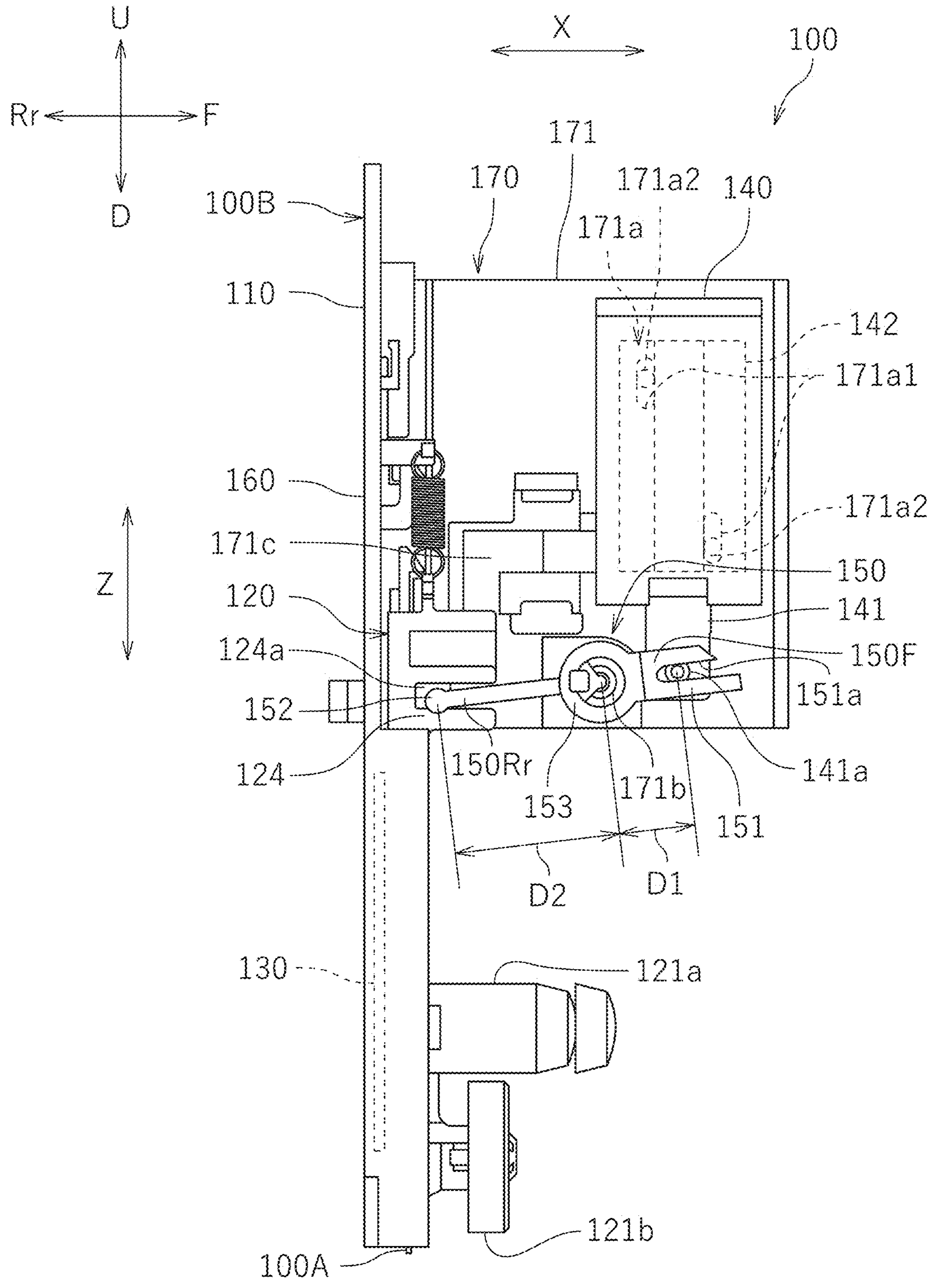
FIG. 10 is a left side view of the sheet cutter unit with the holder in the elevated state.

As shown in FIG. 8, the cover 172 includes a pressing portion 172a that extends from the inner side surface of the cover 172 (herein, the right side surface) toward the inside of the case 170 (herein, rightward). As the cover 172 is attached to the side plate 171, the pressing portion 172a presses the arm 171c and deforms the arm 171c so that the arm 171c moves away from the holder 120. As shown in FIG. 9, with the cover 172 attached to the side plate 171, the pressing portion 172a opposes the horizontal portion of the arm 171c, and presses the arm 171c rightward, thereby deforming the arm 171c toward the right side. Thus, the vertical portion of the arm 171c retracts from upward of the holder 120. This cancels the restriction of the upward movement of the holder 120 by the arm 171c. As the arm 171c moves away from the holder 120, the holder 120 and the sheet cutter 100A are allowed to move in the up-down direction Z. FIG. 10 shows a left side view of the sheet cutter unit with the holder 120 in the elevated state. In the state shown in FIG. 10, the cover 172 is attached to the side plate 171, but the cover 172 is not shown in FIG. 10 so that the inside of the case 170 can be seen.

As shown in FIG. 6 and FIG. 10, the actuator 140 includes a rod 141 that extends/retracts in the up-down direction Z, and a driving portion 142 that drives the rod 141. The extension/retraction direction of the rod 141 is herein the up-down direction Z. While there is no limitation on the configuration of the actuator 140, the actuator 140 is herein an electromagnetic actuator. The driving portion 142 is a solenoid coil. The driving portion 142 is electrically connected to the control device 200 and controlled by the controller 200. The rod 141 includes an iron core built therein, and is extended/retracted in the up-down direction Z as the driving portion 142 is turned ON/OFF. A downward portion of the rod 141 protrudes downward relative to the driving portion 142. When the driving portion 142 is turned ON, the solenoid coil of the driving portion 142 contracts and the rod 141 is pulled upward. When the driving portion 142 is turned OFF, the solenoid coil of the driving portion 142 extends and the rod 141 is lowered by its own weight. Provided at the lower end portion (tip portion) of the rod 141 is a link connecting portion 141a to which one end of the link member 150 (the first connecting portion 151 to be described below) is connected. The link connecting portion 141a is configured in a cylindrical shape and extends toward the left side.

Figure 11:
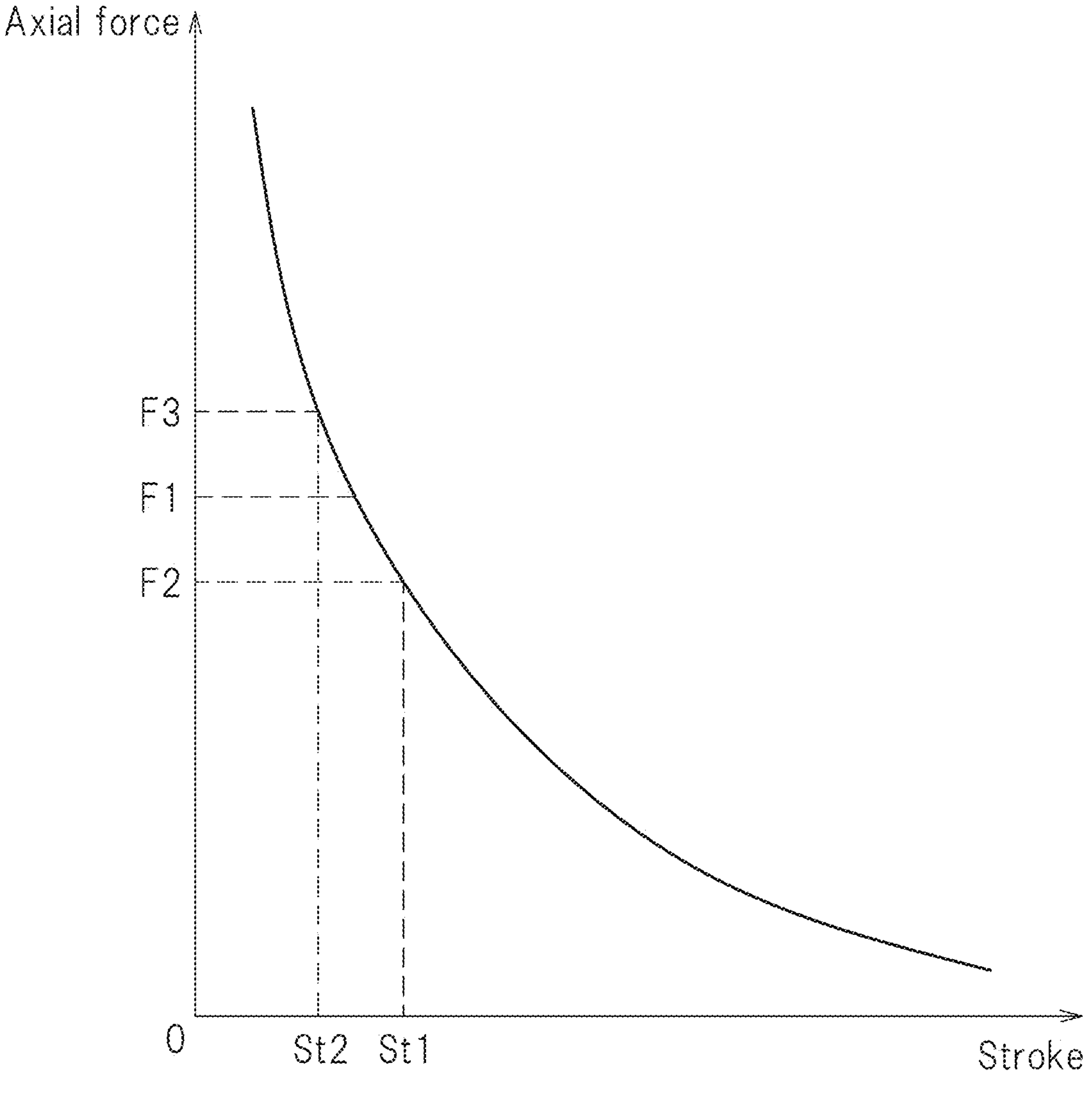
FIG. 11 is a graph showing the driving force characteristics of the actuator.

The actuator 140 is an actuator in which the axial force of the rod 141 varies depending on the position of the rod 141. The actuator 140 herein is an actuator whose axial force increases as it moves toward the stroke end on the contraction side (the upper side). FIG. 11 is a graph showing the driving force characteristics of the actuator 140. The horizontal axis in FIG. 11 is the stroke of the rod 141. The horizontal axis "0" is the stroke end of the rod 141 on the upper side. The vertical axis of FIG. 11 is the axial force of the rod 141, more specifically, the axial force with which the rod 141 is urged to contract. Since the electromagnetic force driving the rod 141 is greater when the distance between the rod 141 and the driving portion 142 is smaller, the actuator 140 exerts a greater driving force when the rod 141 is located at a position closer to the upper stroke end as shown in FIG. 11.

The link member 150 is connected to the rod 141 of the actuator 140 and the holder 120 and transmits the driving force of the rod 141 to the holder 120. The holder 120 moves in the up-down direction along the slide guide 130 by the driving force of the rod 141 transmitted via the link member 150. As shown in FIG. 6, the link member 150 is a rod-shaped member, and includes the first connecting portion 151 connected to the rod 141, the second connecting portion 152 connected to the holder 120, and the bearing portion 153 connected to the rotation shaft 171b provided in the case 170. The first connecting portion 151 is provided at the front end portion of the link member 150. The second connecting portion 152 is provided at the rear end portion of the link member 150. The bearing portion 153 is provided between the first connecting portion 151 and the second connecting portion 152. The link member 150 is configured so that the link member 150 can rotate around the rotation shaft 171*b* provided in the case 170. The link member 150 is made of a resin, for example.

The first connecting portion 151 is provided on the side of the actuator 140 relative to the bearing portion 153, herein forward of the bearing portion 153. As shown in FIG. 6, the first connecting portion 151 is configured in a C-letter shape that is open toward the front side. The first connecting portion 151 includes a link groove 151*a* that forms a recessed portion of the C-letter shape. The link groove 151*a* extends from the front end of the link member 150 toward the bearing portion 153. The link connecting portion 141*a* of the rod 141 of the actuator 140 is inserted into the link groove 151*a*. When the rod 141 is extended/retracted, the link connecting portion 141*a* of the rod 141 and the link groove 151*a* move relative to each other as if they slide against each other, thereby causing the link member 150 to rotate around the rotation shaft 171*b*.

The second connecting portion 152 is provided on the side of the holder 12 relative to the bearing portion 153, herein rearward of the bearing portion 153. As shown in FIG. 6, the second connecting portion 152 is configured in a cylindrical shape extending in the left-right direction. The second connecting portion 152 is inserted into the link groove 124*a* of the holder 120. When the rod 141 is extended/retracted, the link member 150 revolves around the rotation shaft 171*b*, thereby causing the second connecting portion 152 to press against a wall portion upward of the link groove 124*a* or a wall portion downward of the link groove 124*a*. Thus, the holder 120 moves in the up-down direction Z. As shown in FIG. 6, in the present preferred embodiment, the holder 120 moves down as the rod 141 contracts and moves closer to the upper stroke end. As shown in FIG. 10, the holder 120 rises as the rod 141 extends and moves closer to the lower stroke end. Note however that it is the spring 160 that pulls up the holder 120 at this time. The rotation shaft 171*b* rotatably supports the link member 150 so that the holder 120 moves in the up-down direction Z in response to the extension/retraction of the rod 141. The link member 150 and the rotation shaft 171*b* of the link member 150 are configured so that the holder 120 moves toward the platen 12 when the rod 141 moves upward, and the holder 120 moves away from the platen 12 when the rod 141 moves downward, which is the opposite direction. As described above, in the present preferred embodiment, the actuator 140 is an actuator whose axial force increases as it moves toward the upper stroke end, so that the downward thrust of the sheet cutter 100A held in the holder 120 increases as the sheet cutter 100A is located more downward.

As shown in FIG. 10, in the present preferred embodiment, the distance D2 between the rotation shaft 171*b* and the second connecting portion 152 is larger than the distance D1 between the rotation shaft 171*b* and the first connecting portion 151. This allows the movable range of the holder 120 for the up-down direction Z to be larger than the stroke of the rod 141. The distance D2 may be twice the distance D1, for example. In this case, the movable range of the holder 120 is twice the stroke of the rod 141. Note however that there is no particular limitation on the ratio between the distance D1 and the distance D2.

As shown in FIG. 6, a portion 150Rr between the bearing portion 153 and the second connecting portion 152 of the link member 150 is thinner in thickness in the up-down direction Z than a portion 150F between the bearing portion 153 and the first connecting portion 151. Therefore, the portion 150Rr between the bearing portion 153 and the second connecting portion 152 of the link member 150 is easily elastically deformed when subjected to a force. As will be described in detail below, the portion 150Rr between the bearing portion 153 and the second connecting portion 152 of the link member 150 is configured to be elastically deformed by the driving force of the actuator 140 (see FIG. 15) in a state where the actuator 140 is driven to move the rod 141 upward and where the medium 5 prevents the sheet cutter 100A from penetrating the medium 5. The portion 150Rr between the bearing portion 153 and the second connecting portion 152 of the link member 150 will hereinafter be referred to also as the deformed portion 150Rr. The reason for deforming the deformed portion 150Rr will be discussed below.

The position of the actuator 140 on the side plate 171 in the up-down direction Z is adjusted so that the sheet cutter 100A exerts the maximum thrust when the holder 120 is in the down position P1. Specifically, the position of the actuator 140 on the side plate 171 is adjusted so that the rod 141 is at the upper stroke end when the holder 120 is in the down position P1. As described above, the actuator 140 is configured to drive with maximum axial force when the rod 141 is at the upper stroke end. Therefore, if the rod 141 is at the upper stroke end with the holder 120 in the down position P1, the sheet cutter 100A exerts the maximum thrust when the holder 120 is in the down position P1.

As described above, the down position P1 is herein the lowest position of the holder 120 when the printer 10 is in use. When the holder 120 is in the down position P1, the lower end of the sheet cutter 100A is located downward relative to the medium 5 on the platen 12. The down position P1 is the position of the holder 120 such that the sheet cutter 100A penetrates the medium 5 in a situation where the holder 120 is located upward of the medium 5 supported on the platen 12. The thrust of the sheet cutter 100A is most needed when the sheet cutter 100A penetrates the medium 5. Therefore, the position of the actuator 140 is adjusted so that the sheet cutter 100A exerts the maximum thrust when the holder 120 is in the down position P1.

The actuator 140 is screwed to the actuator mounting portion 171*a* of the side plate 171 in a state where the actuator 140 is under its own weight (where the solenoid coil of the driving portion 142 and the rod 141 are most contracted). Since the side plate 171 includes the actuator mounting portion 171*a* that allows the position of the actuator 140 to be adjusted, it is possible to adjust the position of the actuator 140 in the up-down direction. Note however that the actuator mounting portion 171*a* is not indispensable as long as the actuator 140 can be fixed to the side plate 171 while being under its own weight. The holder 120 is moved downward resisting the restoring force of the spring 160 and the lower end of the arm 171*c* of the side plate 171 abuts against the upper surface of the holder 120, thereby positioning the holder 120 (the sheet cutter 100A) in the down position P1. Then, the holder 120 is moved downward resisting the restoring force of the spring 160 to connect the link member 150 to the rod 141 and the holder 120. After the connection, the holder 120 moves upward by the restoring force of the spring 160, and the lower end of the arm 171*c* of the side plate 171 abuts against the upper surface of the holder 120. Thus, the holder 120 (the sheet cutter 100A) is again positioned in the down position P1. Note that after moving the holder 120 downward resisting the restoring force of the spring 160 and connecting the link member 150 to the rod 141 and the holder 120, the lower end of the arm 171*c* of the side plate 171 abuts against the upper surface of the holder 120 to position the holder 120 (the sheet cutter 100A) in the down position P1. As described above, herein, the actuator 140 is positioned and fixed to the side plate 171 with the actuator 140 under its own weight, i.e., in a state where it is least likely to have a stroke error (where the upper stroke end is reached). Therefore, it is possible to prevent variations in the stroke of the solenoid in the cutter down position. Therefore, the sheet cutter 100A can be reliably penetrated through the sheet without increasing the size of the solenoid of the actuator 140. After adjusting the position of the actuator 140 described above, the cover 172 is attached to the side plate 171. Thus, the pressing portion 172*a* of the cover 172 presses the arm 171*c*. Thus, the arm 171*c* moves away from the holder 120, and the holder 120 can move in the up-down direction Z.

As shown in FIG. 2 and FIG. 3, a first groove 13*a* is provided in a portion of the platen 12 that is located downward of the travel path of the processing cutter 71. The first groove 13*a* is recessed from the surface of the platen 12 so that it is located downward relative to the lower end of the processing cutter 71 when it is lowered. The first groove 13*a* extends in the primary scanning direction Y. A cutter pad (not shown) that can be cut by the processing cutter 71 is fitted in the first groove 13*a*. A second groove 13*b* is provided in a portion of the platen 12 that is located downward of the travel path of the sheet cutter 100A. The second groove 13*b* is recessed from the surface of the platen 12 so that it is located downward relative to the lower end of the sheet cutter 100A when it is lowered. The second groove 13*b* extends in the primary scanning direction Y.

FIG. 12 is a block diagram of the printer 10. As shown in FIG. 12, the control device 200 is connected to, and controls the operation of, the feed motor 33 of the transport device 30, the scan motor 43 of the head moving device 40, the ink head 61 of the print head 60, the solenoid 72*a* of the cutting head 70, the locking solenoid 82 of the lock device 80, the take-up roller 90, and the driving portion 142 of the actuator 140 of the sheet cutter unit 100. While there is no particular limitation on the configuration of the control device 200, the control device 200, for example, includes a central processing unit (CPU) that executes the commands of the control program, a ROM (read only memory) that stores the program executed by the CPU, a RAM (random access memory) used as a working area to expand the program, and a storage device such as a memory that stores programs and various data.

As shown in FIG. 12, the control device 200 includes a sheet cutting control section 210 that controls the cutting operation for the medium 5 by the sheet cutter unit 100 after printing and cutting, and a cutting control section 220 that controls the cutting operation based on cut data. The control device 200 may include other control sections, such as a control section to control the printing operation, but these sections are not discussed herein or illustrated in the figures.

As shown in FIG. 12, the sheet cutting control section 210 includes a continuous cutting control section 211 and an intermittent cutting control section 212. The continuous cutting control section 211 is configured to control the sheet cutter holding device 100B and the head moving device 40 as the cutter moving device so as to continuously cut the medium 5 in the primary scanning direction Y. The intermittent cutting control section 212 is configured to control the sheet cutter holding device 100B and the head moving device 40 as the cutter moving device so as to intermittently cut (perforate) the medium 5 in the primary scanning direction Y.

As shown in FIG. 12, the intermittent cutting control section 212 further includes a coarse cutting section 212A and a fine cutting section 212B that control two types of perforation operations, each of which has a different ratio between the length of the cut portion and the length of the non-cut portion (details of the cut portion and non-cut portion will be described below). The fine cutting section 212B is configured so that the length of the cut portion relative to the length of the non-cut portion is smaller than for the coarse cutting section 212A. That is, for perforation as controlled by the fine cutting section 212B, the ratio of the cut portion is smaller and the ratio of the non-cut portion is larger with respect to the entire processing length as compared with the coarse cutting section 212A. Hereafter, perforation by the coarse cutting section 212A will be referred to also as coarse cutting, and perforation by the fine cutting section 212B will be referred to also as fine cutting. Here, the fine cutting section 212B is configured to execute fine cutting in the first end area A1 (see FIG. 13), which is set to a predetermined width extending from the left end toward the central portion of the medium 5, and the second end area A2 (see FIG. 13), which is set to a predetermined width extending from the right end toward the central portion of the medium 5. The coarse cutting section 212A is configured to execute coarse cutting in the central area A3 between the first end area A1 and the second end area A2.

The cutting control section 220 is set to cut the medium 5 based on the cut data of the processing data. As shown in FIG. 12, the cutting control section 220 includes a processing cutter control section 221 and a sheet cutter control section 222. The processing cutter control section 221 controls the transport device 30, the solenoid 72*a* of the processing cutter holding device 72, and the head moving device 40 so as to cause the processing cutter 71 to cut the medium 5 based on the cut data of the processing data. Where the cut data includes cutting of the medium 5 in the primary scanning direction Y, the sheet cutter control section 222 is configured to control the actuator 140 and the head moving device 40, causing the sheet cutter 100A to perform at least a portion of the cutting in the primary scanning direction Y. The processing cutter control section 221 and the sheet cutter control section 222 may perform continuous cutting or may perform perforation based on the cut data.

The process of continuous cutting and perforation, especially the process of perforation, by the printer 10 according to the present preferred embodiment will now be described. First, the process of continuous cutting will be briefly described.

The continuous cutting is a cutting method for separating a portion of medium 5 from the roll of medium 5 on the supply roller 20. The continuous cutting control section 211 of the control device 200 is set to perform a plurality of steps including the move-toward step and the continuous cutting step to be described below. In the move-toward step, the continuous cutting control section 211 controls the sheet cutter holding device 100B to move the blade portion 101 of the sheet cutter 100A to a position in the up-down direction Z where the medium 5 can be cut. The continuous cutting step is performed after the move-toward step. The continuous cutting step is a step in which the head moving device 40 is controlled to move the sheet cutter holding device 100B from at least one end portion of the medium 5 in the primary scanning direction Y to the other end.

In the example of continuous cutting illustrated herein, the sheet cutter 100A is first lowered to a position that is leftward relative to the left end of the medium 5 (outside of the medium 5) in the move-toward step. The height of the sheet cutter 100A after being lowered is such that the blade portion 101 overlaps the medium 5. In the following continuous cutting step, the sheet cutter 100A is moved from outside the left side of the medium 5 to outside the right side of the medium 5. Thus, the medium 5 is continuously cut in the primary scanning direction Y along the travel path of the sheet cutter 100A.

Perforation is a cutting method to intermittently cut the medium 5 so that the product of the job can be separated, for example. With the printer 10, the medium 5 is taken up on the take-up roller 90 after printing and cutting are complete. Since perforation does not cut the medium 5 off the roll, the medium 5 can be taken up on the take-up roller 90. After the medium 5 is dispensed from the take-up roller 90, the user separates the product of the job by tearing off the perforation.

Figure 13:
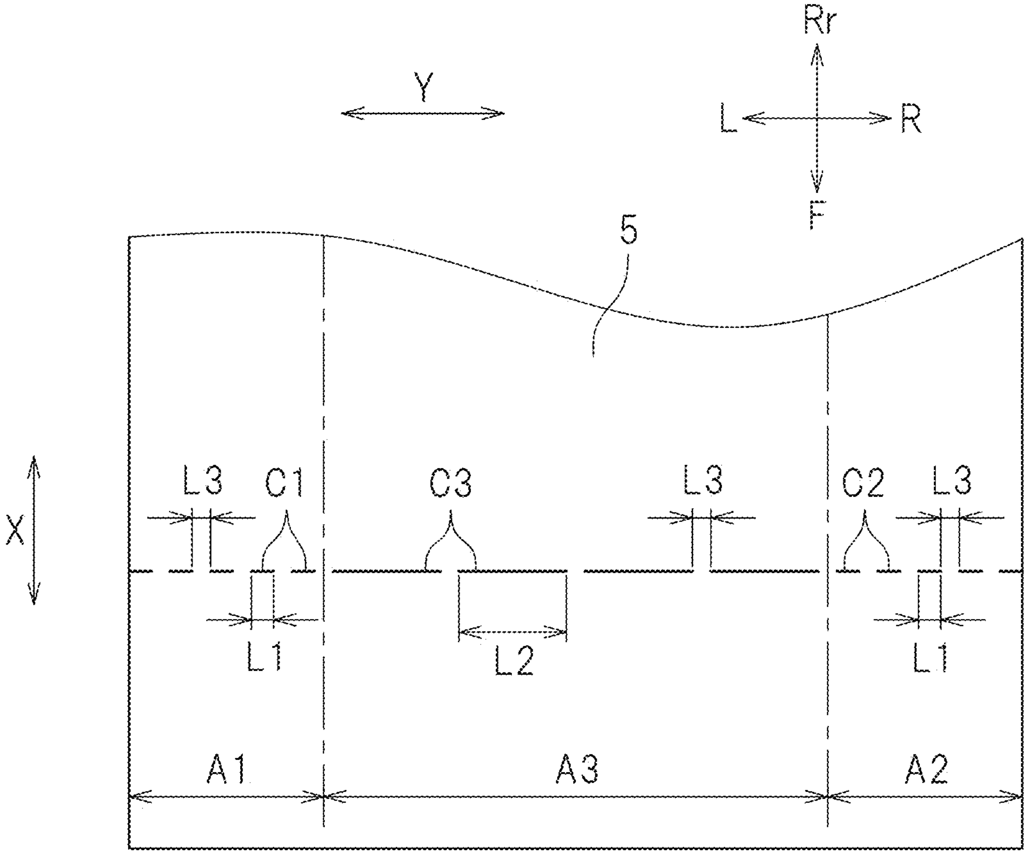
FIG. 13 is a plan view schematically showing the medium after perforation is completed.

Now, FIG. 13 will be used to explain the meaning of "cut portion", "non-cut portion", "cut length", and "uncut length" of perforation. FIG. 13 is a plan view schematically showing an example of the medium 5 after perforation is completed. Cut portions are portions of the medium 5 that are cut (in FIG. 13, a plurality of cut portions C1 to C3), which are represented by solid lines in FIG. 13. Non-cut portions are portions that remain uncut, and non-cut portions are not marked with solid lines in FIG. 13. Cut length is the length of a cut portion in the primary scanning direction Y, and is indicated by reference signs L1 and L2 in FIG. 13. As shown in FIG. 13, cut length is the length of each cut portion (e.g., one cut portion C1). Uncut length is the length of a non-cut portion in the primary scanning direction Y, and is indicated by reference sign L3 in FIG. 13. As described above, coarse cutting is a perforation where the ratio of the cut length to the uncut length is larger, and fine cutting is a perforation where the ratio of the cut length to the uncut length is smaller. Coarse cutting is a perforation where the ratio of the cut portion to the entire portion to be processed is larger, and is therefore a perforation that is easily torn off. Fine cutting is a perforation where the ratio of the cut portion to the entire portion to be processed is smaller, and is therefore a perforation that is less easily torn off. Note that the repetitive pattern of cut portions and non-cut portions will be referred to also as "perforation line" or simply as "cut line".

Figure 14:
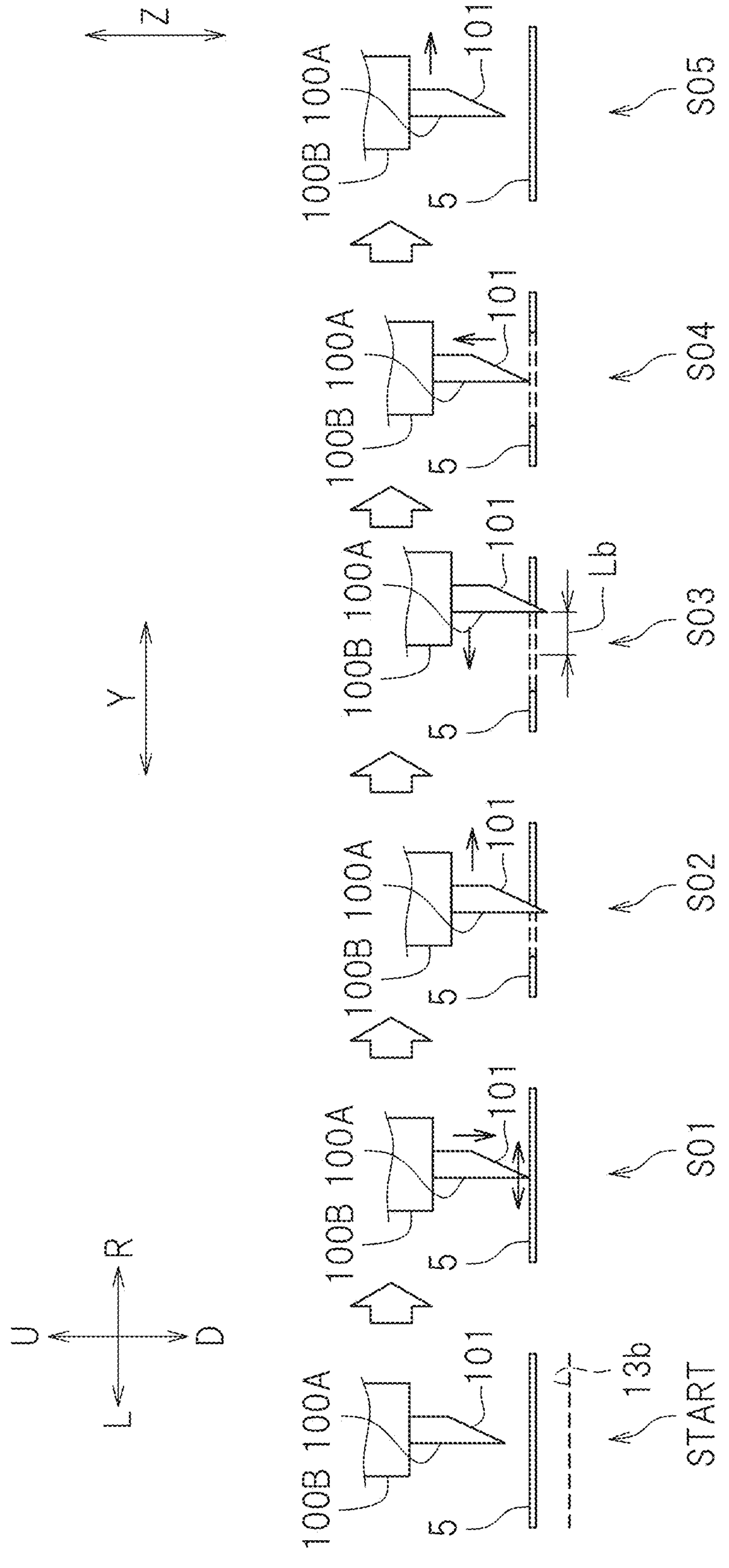
FIG. 14 is a schematic diagram showing the movement of the sheet cutter during perforation.

In the illustrated example, first, fine cutting is performed on the first end area A1 under the control of the fine cutting section 212B. The width of the first end area A1 in the primary scanning direction Y is preferably 5 mm or more and 20 mm or less. FIG. 14 is a schematic diagram showing the movement of the sheet cutter 100A during fine cutting. FIG. 14 illustrates the movement of the sheet cutter 100A when forming a single cut portion. To form multiple cut portions, the steps shown in FIG. 14 are repeated. As shown in FIG. 14, fine cutting is performed by repeatedly executing a plurality of steps, including a penetration step S01, a cutting step S02, a return step S03, a move-away step S04, and a movement step S05.

As shown in FIG. 14, in the START state of the step of forming a cut portion, the sheet cutter 100A is located upward relative to the medium 5. In the penetration step S01, the sheet cutter holding device 100B is controlled to lower the sheet cutter 100A, thereby allowing the blade portion 101 to penetrate the medium 5. In the present preferred embodiment, the fine cutting section 212B is set to perform the reciprocating operation and the pressing operation to be described below in parallel in the penetration step S01. As shown in step S01 of FIG. 14, the reciprocating operation is an operation in which the head moving device 40 is controlled so as to reciprocate the sheet cutter holding device 100B a predetermined number of times in the primary scanning direction Y. The pressing operation is an operation in which the sheet cutter holding device 100B is controlled so as to press the blade portion 101 against the medium 5.

For perforation, the sheet cutter 100A needs to be penetrated through the medium 5 (for continuous cutting, there is no need for the sheet cutter 100A to penetrate the medium 5, and the sheet cutter unit 100 can be moved after lowering the sheet cutter 100A to a position lower than the medium 5 outside the medium 5). However, since the second groove 13*b* is provided downward of the travel path of the sheet cutter 100A, when the medium 5 is pressed by the sheet cutter 100A, the medium 5 escapes into the second groove 13*b*. Therefore, it is difficult to make the sheet cutter 100A penetrate the medium 5 simply by pressing the sheet cutter 100A against the medium 5. Therefore, in the present preferred embodiment, as shown in step S02, the sheet cutter unit 100 is reciprocated a predetermined number of times in the primary scanning direction Y while pressing the sheet cutter 100A downward. This makes it easier for the sheet cutter 100A to penetrate the medium 5.

Figure 15:
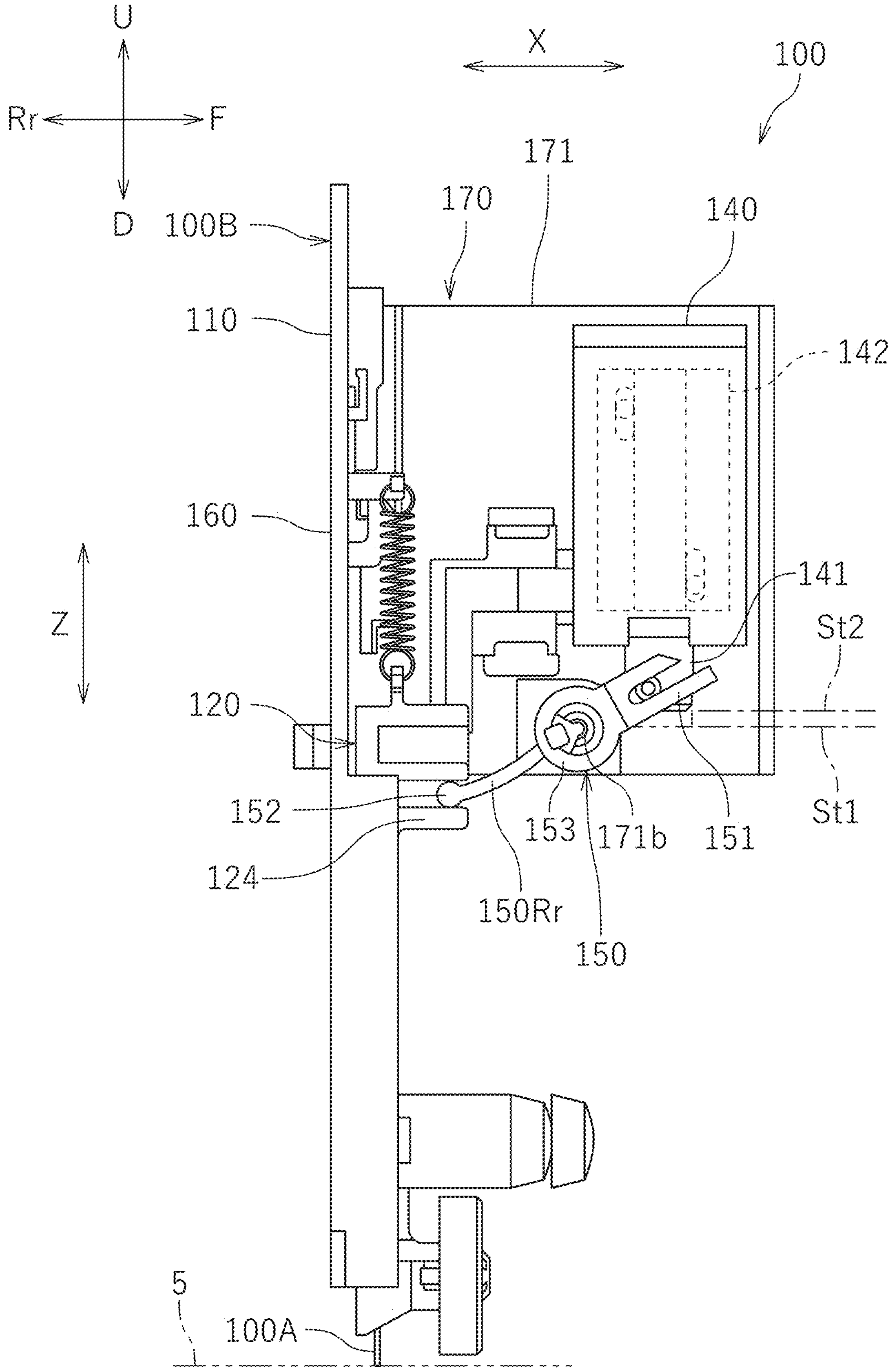
FIG. 15 is a left side view of the sheet cutter unit with the sheet cutter in contact with the medium.

FIG. 15 is a left side view of the sheet cutter unit 100 with the sheet cutter 100A in contact with the medium 5. More specifically, FIG. 15 is a view showing the sheet cutter unit 100 in a state where the sheet cutter 100A is in contact with the medium 5 and the sheet cutter 100A has not penetrated the medium 5. As shown in FIG. 15, where the actuator 140 is driven to lower the sheet cutter 100A and the medium 5 prevents the sheet cutter 100A from penetrating the medium 5, the link member 150 is elastically deformed by the driving force of the actuator 140. Specifically, the deformed portion 150Rr is elastically deformed and bends upward. The deformed portion 150Rr is subjected to a reaction force of the medium 5 in response to the force of the link member 150 pressing down the sheet cutter 100A. This reaction force causes the deformed portion 150Rr to bend upward. The reason why the deformed portion 150Rr is bent as described above is to increase the thrust of the sheet cutter 100A. The reason why the thrust of the sheet cutter 100A increases by the elastic deformation of the deformed portion 150Rr will be described below.

FIG. 11 shows the minimum axial force (hereinafter referred to also as the penetrating axial force F1) required for the rod 141 to allow the sheet cutter 100A to penetrate the medium 5. When the rod 141 is driven by an axial force equal to or greater than the penetrating axial force F1, the sheet cutter 100A can penetrate the medium 5. When the rod 141 can only exert a force less than the penetrating axis force F1, the sheet cutter 100A cannot penetrate the medium 5 due to insufficient thrust. FIG. 11 shows the stroke St1 of the rod 141 at the moment the sheet cutter 100A reaches the medium 5. As shown in FIG. 11, the axial force of the rod 141 at this time is the axial force F2. As shown in FIG. 11, the axial force F2 is smaller than the penetrating axial force F1. Therefore, the sheet cutter 100A cannot penetrate the medium 5 as is. Note that FIG. 15 also shows the stroke St1 of the rod 141 by a two-dot chain line.

FIG. 11 and FIG. 15 further show the stroke St2 of the rod 141 where the deformed portion 150 Rr is deformed by the resistance of the medium 5. As shown in FIG. 15, the stroke St2 is closer to the upper stroke end than the stroke St1 because of the elastic deformation of the deformed portion 150Rr. Therefore, the axial force of the rod 141 is greater than before the elastic deformation of the deformed portion 150Rr. As shown in FIG. 11, the axial force of the rod 141 at this time is the axial force F3, and the axial force F3 is greater than the penetrating axial force F1. Therefore, the sheet cutter 100A can penetrate the medium 5.

Assuming that the link member 150 is not elastically deformed when the sheet cutter 100A is in contact with the medium 5, the sheet cutter 100A cannot penetrate the medium 5 because the axial force of the rod 141 remains the axial force F2. However, in the present preferred embodiment, the elastic deformation of the link member 150 shifts the stroke of the rod 141 to stroke St2, which is closer to the upper stroke end. Thereby, the axial force of the rod 141 shifts to the axial force F3, which is greater than the penetrating axial force F1. Therefore, with the printer 10 according to the present preferred embodiment, the sheet cutter 100A can penetrate the medium 5.

In the present preferred embodiment, in order to increase the length of the stroke of the sheet cutter 100A to obtain a required stroke, the distance D2 between the rotation shaft 171*b* and the second connecting portion 152 is set to be larger than the distance D1 between the rotation shaft 171*b* and the first connecting portion 151 (see FIG. 10). With such a configuration, it is possible to realize the stroke needed even by using a small actuator with a short stroke. However, a small actuator has a small axial force. Moreover, in inverse proportion to the increase in the stroke of the sheet cutter 100A, the thrust force that pushes down the sheet cutter 100A is smaller than the axial force of the rod 141. In the present preferred embodiment, in order to compensate for this, the deformed portion 150Rr of the link member 150 is configured to be elastically deformable.

Referring back to FIG. 14, after the penetration step S01, a cutting step S02 is performed. In the cutting step S02, the head moving device 40 is controlled by the fine cutting section 212B, and the sheet cutter holding device 100B is moved rightward by the distance L1 (see FIG. 13). The distance L1 is the cut length in fine cutting. The cutting step S02 forms the cut portion C1. The distance L1 is shorter than the length of the medium 5 in the primary scanning direction Y and even shorter than the cut length L2 in coarse cutting.

After the cutting step S02, a return step S03 is performed. In the return step S03, the head moving device 40 is controlled by the fine cutting section 212B to move the sheet cutter holding device 100B by the distance Lb to the right (in the direction opposite to the direction in which perforation proceeds) The return distance Lb is set to be less than or equal to the distance L1, i.e., the cut length in fine cutting. The return movement of step S03 prevents the sheet cutter 100A and the medium 5 from catching and damaging the medium 5 when the sheet cutter 100A is moved upward in the following move-away step S04. Note that while the sheet cutter unit 100 is moved rearward in the cutting direction by a predetermined distance Lb in the return step S03 in the present preferred embodiment, the sheet cutter unit 100 may be reciprocated back and forth in the cutting direction a predetermined number of times. This can also prevent the sheet cutter 100A and the medium 5 from getting caught in the move-away step S04, similar to the return step S03 described above.

After the cutting step S02 and the return step S03, the move-away step S04 is performed. In the move-away step S04, the sheet cutter holding device 100B is controlled by the fine cutting section 212B and the sheet cutter 100A is raised. Thus, the blade portion 101 moves away from the medium 5.

After the move-away step S04, the movement step S05 is performed. In the movement step S05, the head moving device 40 is controlled by the fine cutting section 212B to move the sheet cutter holding device 100B rightward for a predetermined distance L3 (see FIG. 13). The distance L3 is the uncut length in fine cutting. The distance L3 is also shorter than the length of the medium 5 in the primary scanning direction Y. The uncut length L3 is preferably about 5 mm or less, for example. If the uncut length L3 is about 5 mm or less, for example, the user can easily tear off the perforation neatly. By repeating steps Sa1 to S05, fine cutting is performed on the first end area A1 of the medium 5.

For the central area A3 of the medium 5, coarse cutting is performed under the control of the coarse cutting section 212A. The coarse cutting is similar to the fine cutting, except that the cut length is the distance L2 (see FIG. 13), which is longer than the distance L1. Thus, coarse cutting, which is easier to tear off than fine cutting, is formed in the central area A3. In the present preferred embodiment, the uncut length in coarse cutting is the same as the uncut length L3 in fine cutting. Note however that the uncut length in coarse cutting may be different from the uncut length L3 in fine cutting. While the ratio of the cut length to the uncut length in fine cutting is smaller than the ratio of the cut length to the uncut length in coarse cutting, there is no particular limitation on the cut length and uncut length in fine cutting and coarse cutting.

In the following perforation for the second end area A2, fine cutting is performed. Here, the second end area A2 is formed in left-right symmetry with the first end area A1. The width of the second end area A2 in the primary scanning direction Y is the same as the width of the first end area A1 in the primary scanning direction Y. Note however that the width of the first end area A1 in the primary scanning direction Y and the width of the second end area A2 in the primary scanning direction Y may be different.

Figure 16:
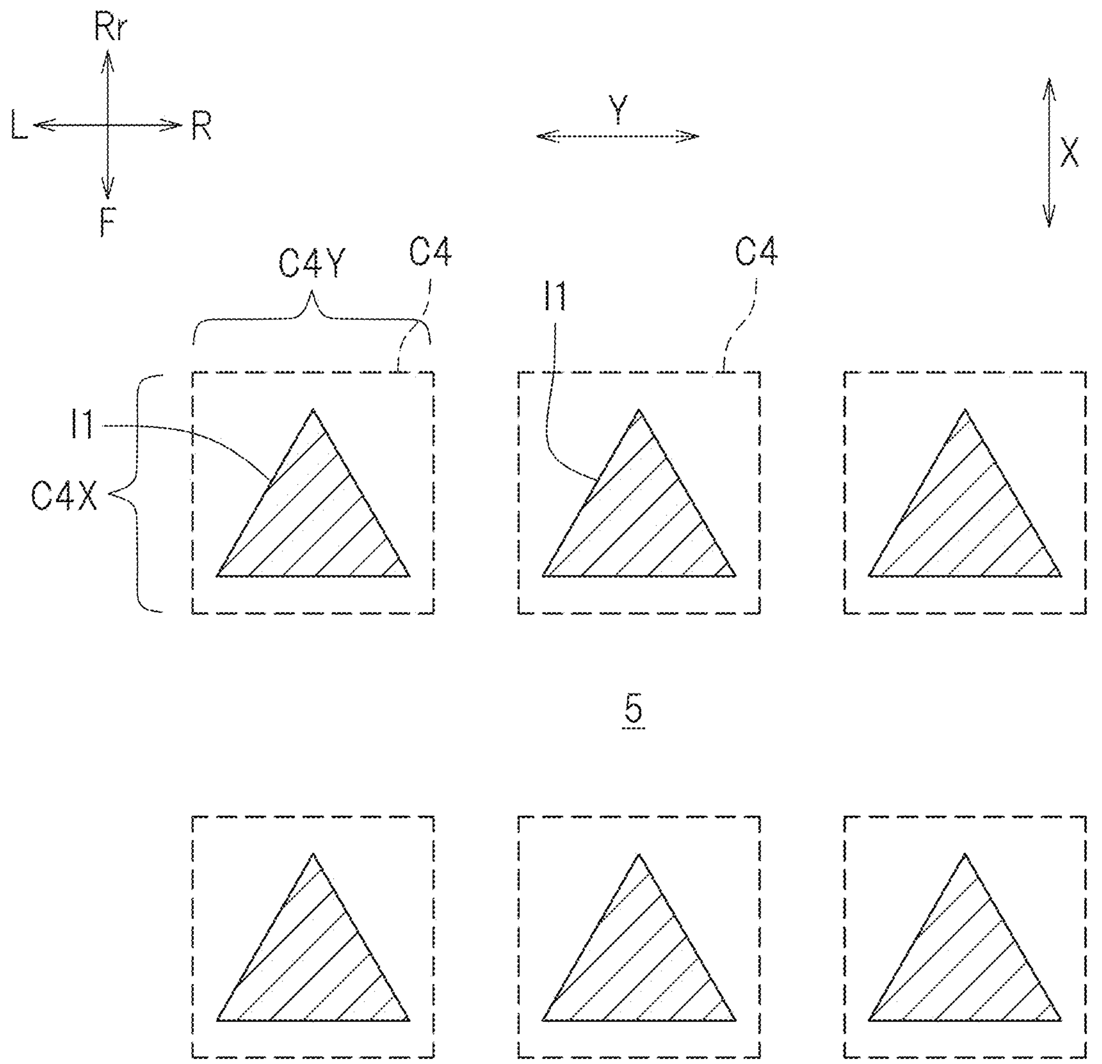
FIG. 16 is a schematic plan view of the medium after the perforation around an image is completed.

With the printer 10 according to the present preferred embodiment, a portion or an entirety of the cut line included in the cut data that extend in the primary scanning direction Y can be cut by the sheet cutter 100A. As an example, a case in which the sheet cutter 100A is used to form a perforation line that is set around an image will now be described. FIG. 16 is a plan view schematically showing the medium 5 after perforation around images is completed. In the example shown in FIG. 16, a plurality of image objects I1 are printed on the medium 5, and perforation lines C4, which are rectangular as viewed from above, are set around the image objects I1. The data of the perforation lines C4 is included in the cut data. The user can separate the image objects I1 from the medium 5 by tearing off the perforation lines C4.

As shown in FIG. 16, the perforation lines C4 each include two cut lines C4Y extending in the primary scanning direction Y and two cut lines C4X extending in the sub-scanning direction X. The printer 10 according to the present preferred embodiment forms two cut lines C4X by the processing cutter 71, as with conventional techniques. On the other hand, the printer 10 forms two cut lines C4Y by the sheet cutter 100A. Note that cut lines formed by the sheet cutter 100A may be continuous cut lines or a mixture of continuous cut lines and perforation lines.

Functions and effects of the present preferred embodiment will now be described.

The printer 10 according to the present preferred embodiment includes the sheet cutter holding device 100B that holds the sheet cutter 100A capable of cutting the medium 5 and moves the sheet cutter 100A in the toward-away direction (herein, the up-down direction Z) in which the sheet cutter 100A moves toward and away from the platen 12, and the head moving device 40 as a cutter moving device that moves the sheet cutter holding device 100B in the primary scanning direction Y. With such a configuration, the sheet cutter holding device 100B can freely move the sheet cutter 100A into contact with or away from the medium 5, and the sheet cutter 100A can be moved in the primary scanning direction Y, which is the cutting direction, by the head moving device 40. Therefore, by combining the movement of the sheet cutter holding device 100B and the movement of the head moving device 40, it is possible to flexibly accommodate various types of cutting.

Particularly, in the present preferred embodiment, the printer 10 includes the continuous cutting control section 211 that cuts (continuously cuts) the medium 5 in the primary scanning direction Y, and the intermittent cutting control section 212 that intermittently cuts (perforates) the medium 5 in the primary scanning direction Y. The continuous cutting control section 211 is configured to perform a group of steps including the move-toward step of controlling the sheet cutter holding device 100B to move the blade portion 101 to a position in the up-down direction Z at which it is possible to cut the medium 5, and the cutting step, following the move-toward step, of controlling the sheet cutter holding device 100B to move the sheet cutter holding device 100B at least from one end to the other end of the medium 5 in the primary scanning direction Y. By performing the group of steps, the medium 5 is continuously cut from one end to the other end in the primary scanning direction Y.

On the other hand, the intermittent cutting control section 212 is configured to repeatedly perform the penetration step S01 of controlling the sheet cutter holding device 100B to allow the blade portion 101 to penetrate the medium 5 (see FIG. 14; this similarly applies also to the subsequent steps), the cutting step S02, after the penetration step S01, of moving the sheet cutter holding device 100B by a cut length (L1 in the case of fine cutting, and L2 in the case of coarse cutting) that is shorter than the length of the medium 5 in the primary scanning direction Y, the move-away step S04, after the cutting step S02, of controlling the sheet cutter holding device 100B to move the blade portion 101 away from the medium 5, and the movement step S05, after the move-away step S04, of moving the sheet cutter holding device 100B by the uncut length L3 shorter than the length of the medium 5 in the primary scanning direction Y. That is, by performing group of steps, it is possible to perform a perforation, where the cut length is L1 or L2 and the uncut length is L3. Therefore, unlike conventional processing devices with sheet cutters (including, for example, printers, cutting machines, and printers with cutting heads) that cut sheets by rotating and driving a circular blade in the primary scanning direction, it is possible to perform perforation and continuous cutting without changing the blade. Similarly, with the printer 10 according to the present preferred embodiment, it is possible to change the cut length and the uncut length of perforation without replacing the blade of the sheet cutter 100A.

In the present preferred embodiment, the sheet cutter holding device 100B includes the link member 150 connected to the rod 141 of the actuator 140 and the holder 120, so that the link member 150 rotates in response to extension/retraction of the rod 141 and the holder 120 moves in the toward-away direction. With such a configuration, since the stroke or the axial force of the rod 141 can be increased using the link member 150, the sheet cutter holding device 100B can be configured using a compact actuator. Thus, it is possible to reduce the size of the sheet cutter holding device 100B. By using a small actuator, the sheet cutter holding device 100B can be configured at a low cost.

In the present preferred embodiment, the distance D2 (see FIG. 10) between the rotation shaft 171*b* of the link member 150 and the second connecting portion 152 (a connecting portion with the holder 120) is larger than the distance D1 (also see FIG. 10) between the rotation shaft 171*b* and the first connecting portion 151 (a connecting portion with the rod 141). With such a configuration, the stroke of the sheet cutter 100A can be made larger than the stroke of the rod 141 by using the link member 150.

The actuator 140 according to the present preferred embodiment is an actuator whose axial force increases as the rod 141 moves toward one stroke end (herein, the stroke end on the contraction side), and the sheet cutter holding device 100B is configured so that the holder 120 moves toward the platen 12 as the rod 141 moves in the direction of the stroke end on the contraction side. The link member 150 is elastically deformed by the driving force of the actuator 140 where the actuator 140 is driven to move the rod 141 in the direction of the stroke end on the contraction side and where the medium 5 is preventing the sheet cutter 100A from penetrating the medium 5. With such a configuration, it is possible to increase the thrust of the sheet cutter 100A for reasons discussed above. Therefore, even if a small actuator with a small axial force is used, it is possible to allow the sheet cutter 100A to penetrate the medium 5.

In the present preferred embodiment, the sheet cutter holding device 100B includes the spring 160 that biases the holder 120 in the direction in which the holder 120 moves away from the platen 12 (herein upward), the side plate 171 that holds the holder 120 and the actuator 140, and the cover 172 that is attached to the side plate 171. The side plate 171 includes the arm 171*c* that contacts the holder 120 located in the down position P1 where the cover 172 is not attached and that holds the holder 120 in the down position P1 resisting the biasing force of the spring 160. The cover 172 includes the pressing portion 172*a* that presses the arm 171*c* by being attached to the side plate 171 and deforms the arm 171*c* so that the arm 171*c* moves away from the holder 120. The holder 120 and the sheet cutter 100A can move in the up-down direction as the arm 171*c* moves away from the holder 120. With such a configuration, the arm 171*c* can hold the holder 120 in the down position P1 despite the biasing force of the spring 160. Therefore, the driving force of the actuator 140 can be set so that the sheet cutter 100A exerts the maximum thrust in the condition that the holder 120 is held in the down position P1, i.e., in the condition that the sheet cutter 100A penetrates the medium 5. Moreover, simply by attaching the cover 172 to the side plate 171, it is possible to release the holding of the holder 120 by the arm 171*c*, and the holder 120 and the sheet cutter 100A can be moved in the toward-away direction.

In the present preferred embodiment, the position at which the actuator 140 is fixed to the side plate 171 is adjusted to such a position that the rod 141 is located at the stroke end on the contraction side in a state where the holder 120 is located in the down position P1. Therefore, the actuator 140 can exert the maximum axial force when the holder 120 is located in the down position P1. Since the sheet cutter 100A penetrates the medium 5 immediately before the down position P1, such a configuration can maximize the thrust of the sheet cutter 100A when penetrating the medium 5. Since there are individual variations in the stroke of the actuator 140, it is difficult to position the actuator 140 so as to maximize the thrust of the sheet cutter 100A when penetrating the medium 5 without physically matching the down position P1 of the holder 120 and the stroke end of the rod 141. With the configuration described above, when the holder 120 is located in the down position P1, the rod 141 is located at the stroke end on the contraction side. Therefore, there is less error in thrust as compared with a case where the rod 141 is located at the stroke end on the extension side in the state where the holder 120 is located in the down position P1. Thus, such physical matching can be done easily.

In the present preferred embodiment, the extension/retraction direction of the rod 141 is the up-down direction, and the stroke end at which the axial force of the rod 141 is greater is the upper stroke end. The long hole 171*a*1 for adjusting the position of the actuator 140 in the up-down direction is configured so that the actuator 140 can be lowered by its own weight until the rod 141 is located at the upper stroke end when the holder 120 is located in the down position P1. With such a configuration, the actuator 140 naturally lowers by its own weight until the rod 141 reaches the upper stroke end. Therefore, it is possible to easily adjust the position of the actuator 140.

In the present preferred embodiment, as the cover 172 is attached to the side plate 171, the side plate 171 and the cover 172 together form the case 170 that accommodates at least the actuator 140, the link member 150, and the rotation shaft 171*b* of the link member 150. With such a configuration, it is possible to adjust the position of the actuator 140 as described above by attaching/removing the cover 172, which is an essential element for covering the actuator 140 and the link member 150, which are movable parts. Therefore, the assembly work of the sheet cutter holding device 100B can be simplified, and it is possible to save members of the sheet cutter holding device 100B.

As to control the movement of the sheet cutter 100A, the printer 10 according to the present preferred embodiment is configured so as to perform, in parallel in the penetration step S01 of perforation, a reciprocating operation of reciprocating the sheet cutter holding device 100B in the primary scanning direction Y a predetermined number of times, and a pressing operation of pressing the blade portion 101 against the medium 5. With such an operation, the sheet cutter 100A can easily penetrate the medium 5.

Moreover, the printer 10 according to the present preferred embodiment is configured to perform, after the cutting step S02 and before the move-away step S04, the return step S03 of moving the sheet cutter holding device 100B rearward in the cutting direction by a predetermined return distance Lb. With such an operation, it is possible to prevent the sheet cutter 100A and the medium 5 from getting caught and damaging the medium 5 in the move-away step S04. Note that the sheet cutter unit 100 may be reciprocated a predetermined number of times forward and rearward in the cutting direction in the return step. "Moving the sheet cutter holding device 100B rearward in the cutting direction by a return distance" is an element that is included in such a reciprocating motion, and the movement of the sheet cutter unit 100 forward in the cutting direction is an element that can be optionally added to the movement of the sheet cutter unit 100 rearward in the cutting direction.

With the printer 10 according to the present preferred embodiment, the ratio of the cut portion to the remaining portion in an end portion of the medium 5 is smaller than that in a central portion (The ratio of the remaining portion to the cut portion in an end portion of the medium 5 is larger than that in a central portion). The printer 10 is configured to perform fine cutting on an end portion of the medium 5, i.e., the first edge area A1 set to a predetermined width extending from one end of the medium 5 toward the central portion in the primary scanning direction Y, and the second edge area A2 set to a predetermined width extending from the other end of the medium 5 toward the central portion in the primary scanning direction Y. The printer 10 is configured to perform coarse cutting on the central portion of the medium 5, i.e., the central area A3 between the first end area A1 and the second end area A2. Herein, fine cutting is a perforation, in which the uncut length L3 is equal to coarse cutting and the cut length L1 is shorter than coarse cutting (as shown in FIG. 13, the cut length L2 of coarse cutting is longer than the cut length L1 of the fine cut). As a result, the ratio of the cut length to the uncut length and the ratio of the cut length to the entire length to be processed for fine cutting are smaller than those for coarse cutting. With such a control, the perforation can be made less easily breakable when the medium 5 is taken up by the take-up roller 90, while making the perforation easier to tear off when the user tears off the perforation.

With the medium 5 that has been sheet-cut at perforation, if the perforation is broken at opposite end portions of the medium 5 in the width direction (the primary scanning direction Y), problems are likely to occur such as the medium 5 turning up from there. Particularly, when the medium 5 is taken up by the take-up roller 90, a tension is applied to the medium 5 in the take-up direction, so there is a high risk that the perforation breaks. In view of this, in the present preferred embodiment, in the first end area A1 and the second end area A2 at opposite end portions of the medium 5 in the width direction (the primary scanning direction Y), fine cutting in which the proportion of the non-cut portion is large is performed so as to prevent the perforation from breaking. On the other hand, in the central area A3, which is located in the central portion of the medium 5 in the width direction (the primary scanning direction Y), there are few problems even if the perforation is broken. Therefore, in the central area A3, coarse cutting in which the proportion of the cut portion is larger (the proportion of the non-cut portion is smaller) is performed so that the user can easily tear off the perforation. Thus, the perforation can be made less easily breakable when the medium 5 is taken up by the take-up roller 90, while the perforation can be easily torn off when the user tears off the perforation.

In the present preferred embodiment, the length of the first end area A1 in the primary scanning direction Y and the length of the second end area A2 in the primary scanning direction Y are equal to each other, and the cut length and the uncut length are the same in the first end area A1 and in the second end area A2. Therefore, the perforation formed is symmetrical for the primary scanning direction Y. When taking up the medium 5 by the take-up roller 90, it is advantageous for the tension in the width direction of the medium 5 to be symmetrical in order to take up the medium 5 straight, and therefore it is preferred that the perforation formed is symmetrical for the primary scanning direction Y. Therefore, in the present preferred embodiment, the perforation is formed symmetrical for the primary scanning direction Y. Note however that the length of the first end area A1 in the primary scanning direction Y and the length of the second end area A2 in the primary scanning direction Y may be different, and the cut length and the uncut length may be different between the first end area A1 and the second end area A2.

Note that types of perforation are not limited to two types, i.e., coarse cutting and fine cutting, but there may be three or more types. Areas on the medium 5 to be distinguished by the type of perforation are not limited to three areas. Areas on the medium 5 to be distinguished by the type of perforation may be two areas or less, or may be four areas or more.

In the present preferred embodiment, the cutter moving device that moves the sheet cutter 100A in the cutting direction is the head moving device 40 that moves the cutting head 70 in the primary scanning direction Y. The sheet cutter holding device 100B is held by the second carriage 52 together with the cutting head 70. With such a configuration, the configuration of the printer 10 can be simplified because it is not necessary to provide a cutter moving device separate from the head moving device 40. The cost of the printer 10 can also be reduced.

The printer 10 according to the present preferred embodiment is configured so that at least a portion of the cutting in the primary scanning direction Y is performed by the sheet cutter 100A when the cut data includes cutting of the medium 5 in the primary scanning direction Y. According to such a control, it is possible to reduce the amount of use of the processing cutter 71, and it is possible to reduce the frequency with which the processing cutter 71 is replaced.

Such a control is particularly effective when the cut line extending in the primary scanning direction Y is the perforation line. Normally, most of the continuous cutting in the cut data relates to cases where the medium 5 is a seal material and only the release paper is cut while the backing paper is not cut. In such a case, the processing cutter 71 does not penetrate the medium 5. Therefore, the processing cutter 71 does not cut the cutter pad fitted in the first groove 13*a*. However, in the case of perforation, the processing cutter 71 penetrates the medium 5 and cuts the cutter pad fitted in the first groove 13*a*. Therefore, with perforation, the deterioration of the processing cutter 71 is more significant than with continuous cutting. In the present preferred embodiment, the sheet cutter 100A cuts a portion or an entirety of the cut line in the cut data that extends in the primary scanning direction Y. Therefore, it is possible to reduce the frequency of using the processing cutter 71 for perforation, for which the processing cutter 71 deteriorates more significantly, and as a result, it is possible to reduce the frequency of replacing the processing cutter 71.

Some variations are possible for the preferred embodiments described above. In the first variation, the perforation is formed so that opposite end portions of the medium in the width direction are left uncut in order to prevent the perforation from breaking at the opposite end portions. Note that in the following description of the first variation, the same reference signs will be used as those used in the preferred embodiment described above for members with the same functions as those of the preferred embodiment described above. Redundant descriptions will be omitted or simplified as appropriate. This similarly applies also to other variations.

Figure 17:
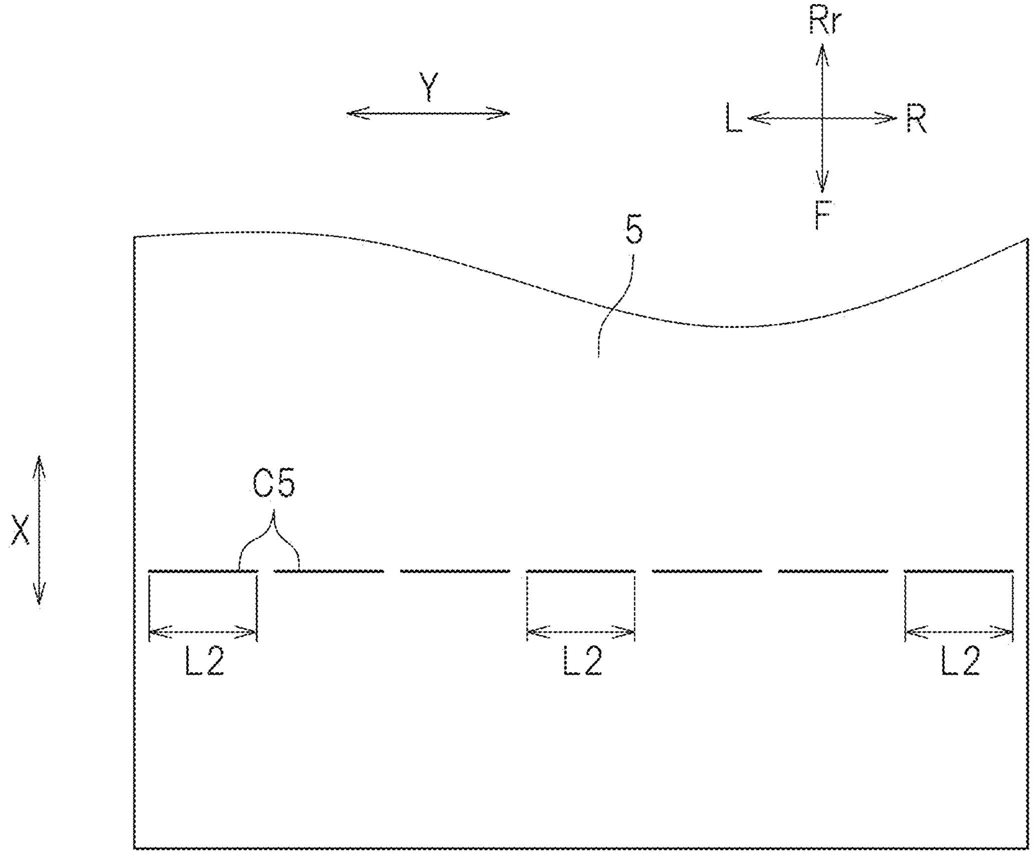
FIG. 17 is a plan view schematically showing the medium after the perforation is completed according to a first variation of a preferred embodiment of the present invention.

FIG. 17 is a plan view schematically showing the medium 5 after perforation is completed according to the first variation of a preferred embodiment of the present invention. As shown in FIG. 17, in this variation, the cut length of the cut portion C5 is not changed by the area of the medium 5. In the example shown in FIG. 17, the cut length is set to the cut length L2 for coarse cutting, so that the user can easily tear off the perforation. Note however that the cut length is not limited to L2.

In this variation of a preferred embodiment of the present invention, the intermittent cutting control section 212 performs the first penetration step so that the blade portion 101 penetrates places of the medium 5 other than the opposite end portions thereof in the primary scanning direction Y, and performs the last cutting step so that the step ends at a place of the medium 5 other than the opposite end portions thereof in the primary scanning direction Y. Therefore, as shown in FIG. 17, in the medium 5 perforated by the printer 10 according to this variation, the opposite end portions of the medium 5 in the primary scanning direction Y are non-cut portions. Also with such a control, it is possible to prevent the problem that the perforation at the opposite end portions of the medium 5 in the width direction (the primary scanning direction Y) breaks, causing the medium 5 to turn up from there. A method as described in this variation may be used if the positional accuracy of the sheet cutter unit 100 that enables such a control of leaving opposite ends uncut can be achieved inexpensively or easily. However, if such a positional accuracy of the sheet cutter unit 100 is difficult to be achieved inexpensively or easily, a method as described in the first preferred embodiment, for example, may be used. The control of this variation may be combined with the control in the first preferred embodiment. For example, fine cutting where opposite ends of the medium 5 in the primary scanning direction Y are left uncut may be performed in end areas, while performing coarse cutting in the central area.

Figure 18:
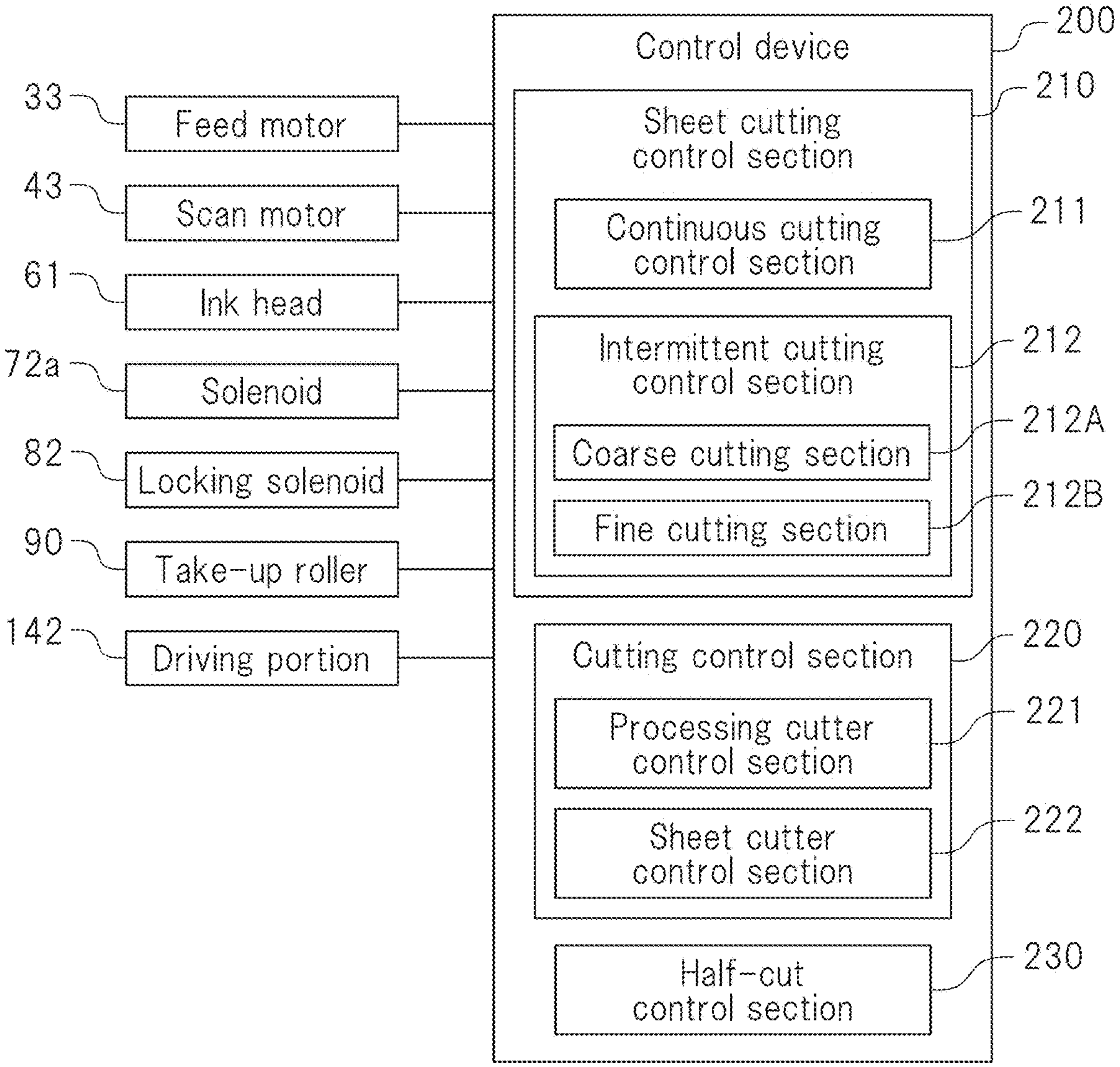
FIG. 18 is a block diagram of a printer with a cutting head according to a second variation of a preferred embodiment of the present invention.

In the second variation of a preferred embodiment of the present invention, the printer 10 sheet-cuts the medium 5 by both the sheet cutter 100A and the processing cutter 71. FIG. 18 is a block diagram of the printer 10 according to the second variation. As shown in FIG. 18, the control device 200 according to this variation includes a half-cut control section 230. The half-cut control section 230 controls the processing cutter holding device 72 and the head moving device 40. The half-cut control section 230 is configured to perform a move-toward step of controlling the processing cutter holding device 72 to move the processing cutter 71 to a position where a portion of the medium 5 can be cut for the up-down direction Z, and a partial cutting step, after the move-toward step, of controlling the head moving device 40 to move the processing cutter holding device 72 at least from one end portion of the medium 5 in the primary scanning direction Y to the other end portion. The position of the processing cutter 71 in the up-down direction Z such that a portion of the medium 5 is cut may be, for example, such a position that only the release paper of the seal material is cut while the backing paper is not cut. Note however that there is no particular limitation on the position of the processing cutter 71 in the up-down direction Z. Under the control of such a half-cut control section 230, only an upper portion of the medium 5 is cut in the primary scanning direction Y. The intermittent cutting control section 212 is configured to perform a perforation along the line along which the partial cutting step has been performed by the half-cut control section 230. On this line, the thickness of the uncut portion of the medium 5 is thinner than the original thickness of the medium 5. Therefore, it is easier to penetrate and cut the medium 5 with the sheet cutter 100A.

Note that while partial cutting of the medium 5 is performed with the processing cutter 71 in this variation, it may be performed with the sheet cutter 100A. That is, only an upper portion of the medium 5 may be first cut in the primary scanning direction Y with the sheet cutter 100A, and then the medium 5 may be perforated along the same line with the sheet cutter 100A.

Figure 19:
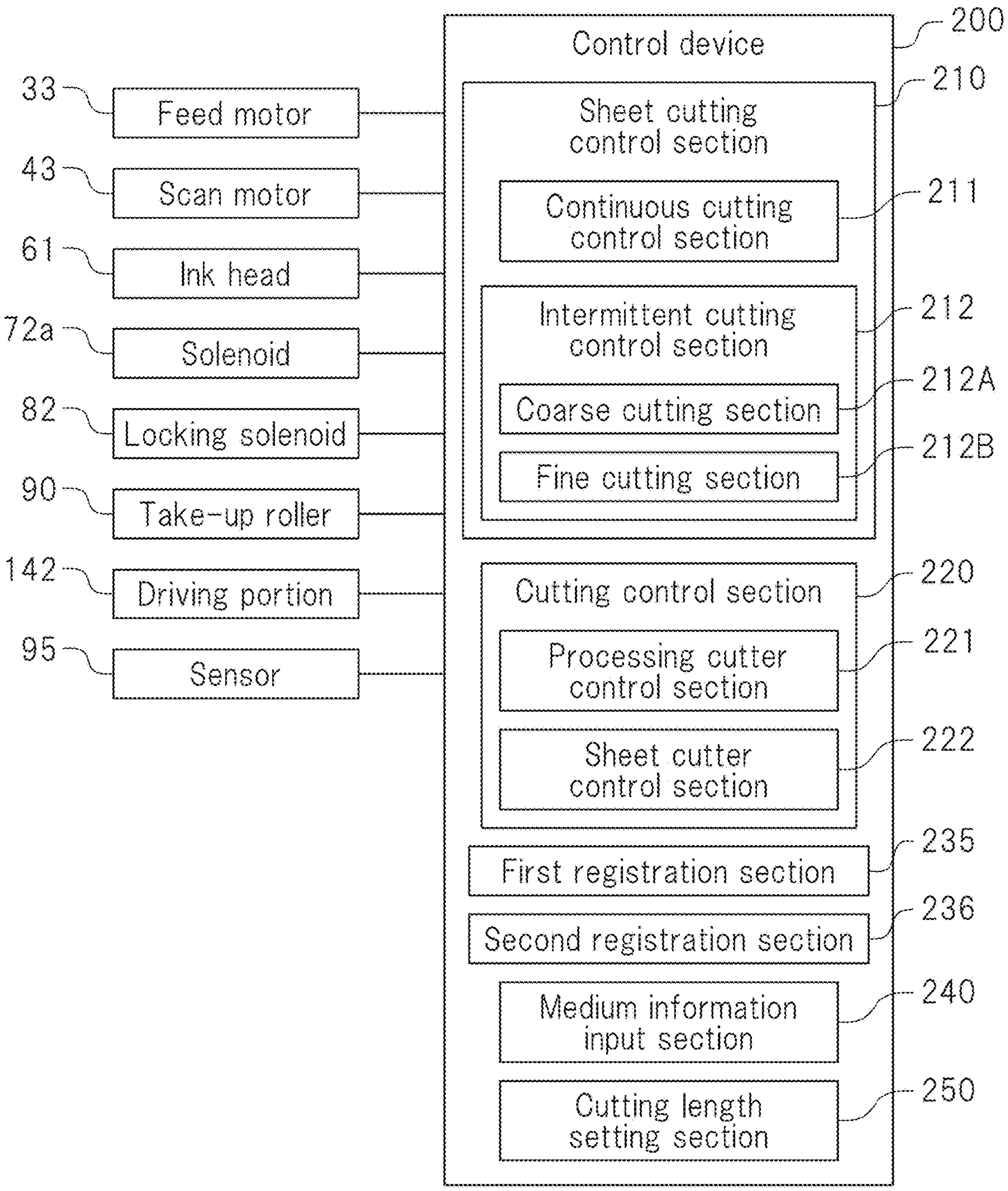
FIG. 19 is a block diagram of a printer with a cutting head according to a third variation of a preferred embodiment of the present invention.
Figure 20:
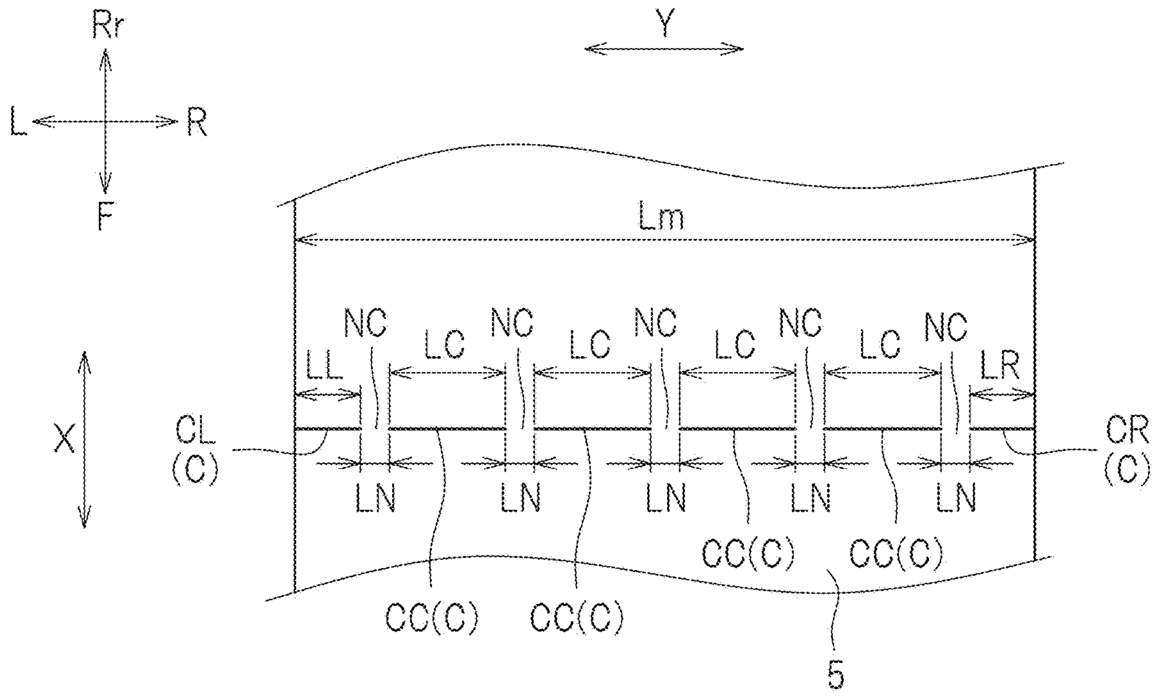
FIG. 20 is a schematic plan view of the medium perforated by the printer with a cutting head according to the third variation of a preferred embodiment of the present invention.

In the third variation of a preferred embodiment of the present invention, the printer 10 sets the perforation cut length based on the width of the medium 5 in the primary scanning direction Y. FIG. 19 is a block diagram of the printer 10 according to the third variation. FIG. 20 is a schematic plan view of the medium 5 that has been perforated by the printer 10 according to the third variation. In FIG. 20, the cut portion to be cut by perforation is indicated by reference sign C, and the non-cut portion that is left uncut by perforation is indicated by reference sign NC. As shown in FIG. 19, the control device 200 according to this variation includes a first registration section 235, a second registration section 236, a medium information input section 240, and a cut length setting section 250.

Registered in the first registration section 235 are the number of non-cut portions NC and the length thereof (uncut length) LN (see FIG. 20). The total length of a plurality of non-cut portions NC is a predetermined length. In the present preferred embodiment, the length LN of the plurality of non-cut portions NC registered in the first registration section 235 is the same. Therefore, the total length of the non-cut portions NC is equal to the length LN of one non-cut portion NC multiplied by the number of non-cut portions NC. Note however that some or all of the lengths of the plurality of non-cut portions NC registered in the first registration section 235 may differ from one another.

The lengths LL and LR of the cut portions CL and CR at the opposite end portions of the medium 5 in the primary scanning direction Y (reference sign CL represents the cut portion C at the left end of the medium 5, and reference sign CR represents the cut portion C at the right end of the medium 5, see FIG. 20) are registered in the second registration section 236. In the present preferred embodiment, the registered length LL of the cut portion CL at the left end portion of the medium 5 is the same as the registered length LR of the cut portion CR at the right end portion. Note however that the lengths LL and LR may be different from each other.

The length of the medium 5 (the medium width) in the primary scanning direction Y is input to the medium information input section 240. For example, the medium information input section 240 may be configured to select the medium 5 to be used from among different types of medium with different widths. Note however that there is no limitation on the method of setting the length of the medium 5 in the primary scanning direction Y by the medium information input section 240. For example, as shown in FIG. 19, the printer 10 may include a sensor 95 that detects the width of the medium 5 in the primary scanning direction Y. In that case, the sensor 95 may detect the width of the medium 5 in the primary scanning direction Y, for example, by detecting the boundary between the medium 5 and the platen 12 while the sensor 95 is moved in the primary scanning direction Y together with the second carriage 52.

The cut length setting section 250 is configured to set the cut length of the perforation based on the length of the medium 5 in the primary scanning direction Y. Specifically, the cut length setting section 250 sets the number and length of cut portions C so that the number and the uncut length of non-cut portions NC are equal to the number and the length LN registered in the first registration section 235, based on the width of the medium 5 input to the medium information input section 240. The uncut length LN registered in the first registration section 235 is not dependent on the width of the medium 5 in the primary scanning direction Y. More specifically, the cut length setting section 250 calculates the number and length LC (see FIG. 20) of a plurality of cut portions CC other than the cut portions CL and CR at the opposite end portions in the primary scanning direction Y so that the cut portions CL and CR at the opposite end portions in the primary scanning direction Y are formed with the lengths LL and LR registered in the second registration section 236. The cut length setting section 250 is set herein so that the cut portions CC other than the cut portions CL and CR at opposite end portions of the medium 5 in the primary scanning direction Y have an equal length. Thus, a plurality of cut portions CC of the same length are arranged at equal intervals in the portion between the cut portion CL at the left end of the medium 5 and the cut portion CR at the right end of the medium 5. According to such a method, the shorter the length of the medium 5 in the primary scanning direction Y is, the shorter the length LC of one cut portion CC is set. The longer the length of the medium 5 in the primary scanning direction Y, the longer the length LC of one cut portion CC is set.

As shown in FIG. 20, formed in the perforated medium 5 includes the cut portion CL at the left end portion, a plurality of cut portions CC in the central portion, and the cut portion CR at the right end portion. The number of non-cut portions NC is set to M (shown to be five in FIG. 20). Since the uncut length of the non-cut portion NC is LN, the total uncut length is LN×M. It is assumed that the width of medium 5 in the primary scanning direction Y is the length Lm. In this case, in the present preferred embodiment, the non-cut portions NC are evenly formed between the cut portions CL and CR at opposite end portions (thus, the plurality of cut portions CC in the central portion are also evenly arranged), so the length LC of each of the cut portions CC in the central portion is as follows.

$$LC=(Lm-LL-LR-M\times LN)/(M-1)$$

With conventional sheet-cutting, the pitch of cut portions and non-cut portions of the perforation is predetermined. Therefore, when the width of the medium is narrow, the total length of the non-cut portions is shorter, making the perforation easily breakable. If the perforation is easily breakable, problems are more likely to occur, such as the perforation being broken when taking up the medium. On the other hand, if the width of the medium is wide, the total length of the non-cut portions is longer, making it more difficult to tear off the perforation. Thus, with conventional sheet-cutting, the ease of breaking the perforation depends on the width of the medium. An increase in the total length of non-cut portions in a wide medium normally means an increase in the number of non-cut portions and cut portions. Therefore, if the total length of non-cut portions is longer than necessary in a wide medium, the number of non-cut portions and cut portions increases more than necessary, thereby increasing the amount of time required for sheet-cutting.

In contrast, with the printer 10 according to the present preferred embodiment, the total length of the non-cut portions NC is equal to a predetermined length (LN×M in the example described above) determined by the number and the length LN of the non-cut portions NC registered in the first registration section 235. With the medium 5 being equal, the ease of breaking the perforation depends primarily on the total length of the non-cut portions NC. Therefore, with the printer 10 according to the present preferred embodiment can form a perforation with an appropriate degree of breakability, regardless of the length of the medium 5 in the primary scanning direction Y. Since the number of non-cut portions NC is not large even with a wide medium 5, it is possible to reduce or prevent an increase in the amount of time required for sheet-cutting. Particularly, when taking up the medium 5 by the take-up roller 90, the same tension is applied to the medium 5 regardless of the width of the medium 5. Therefore, in the case of a printer where the cut length of perforation does not vary depending on the width of the medium 5, the narrower the medium 5 is, the more easily the perforation is broken while taking up the medium 5. With the printer 10 according to this variation, it is possible to reduce or prevent variations in the ease of breaking the perforation depending on the width of the medium 5 in the primary scanning direction Y.

Note that the number and length of the plurality of non-cut portions NC may be registered in the first registration section 235 for each type of medium 5. Preferably, if the medium 5 is a medium that is easy to break, the total length of the non-cut portions NC registered in the first registration section 235 is preferably long, and if the medium 5 is a medium that is difficult to break, the total length of the non-cut portions NC registered in the first registration section 235 is preferably short. Then, the medium information input section 240 may be configured to allow an input of the type of the medium 5.

There is no limitation on the method of setting the cut length by the cut length setting section 250, as long as the length of the cut portion C is set shorter as the length of the medium 5 in the primary scanning direction Y is shorter. For example, the cut length setting section 250 may be configured to set the lengths of some or all of the plurality of cut portions C to different lengths. The cut length setting section 250 may also be configured to set the lengths of some or all of the plurality of non-cut portions NC to different lengths.

Some preferred embodiments have been described above. However, the preferred embodiments described above are merely illustrative, and the techniques disclosed herein may be implemented in various other forms.

For example, the device with a sheet cutter is a printer with a cutting head in the preferred embodiments described above, but there is no limitation thereto. The device with a sheet cutter may be any processing device that performs some kind of processing on a sheet medium. For example, the processing device may be a printer that includes a print head that prints on a sheet medium but does not include a cutting head, or may be a cutting machine that includes a cutting head that cuts the sheet medium but does not include a print head. Even if the processing device is a printer with a cutting head, the configuration thereof is not limited to that shown in the preferred embodiment.

While each of the processing devices according to the preferred embodiments of the present invention described above includes a take-up roller for taking up the medium having been processed, the processing device is not limited to a processing device that includes a take-up roller. The processing device is not limited to those that perform processing on a medium that is wound into a roll.

While the cutter moving device that moves the sheet cutter unit in the cutting direction is a head moving device that moves the processing head in the preferred embodiments described above, there is no limitation thereto. The processing device may include a cutter moving device that moves the sheet cutter unit in the cutting direction separately from the head moving device that moves the processing head.

While the sheet cutter unit includes a link member that is connected to the actuator and the holder and transmits the driving force of the actuator to the holder in the preferred embodiments described above, the sheet cutter unit does not need to include a link member. There is no further limitation on the sheet cutter unit as long as the sheet cutter unit includes a sheet cutter holding device that holds and moves the sheet cutter in the toward-away direction to move the blade portion of the sheet cutter into contact with or away from the medium supported on the support table. For example, the sheet cutter holding device may be configured so that the holder is moved directly by the actuator.

Even if the sheet cutter unit includes a link member, the configuration of the actuator and the link member is not limited to the configuration shown in the preferred embodiments described above. For example, while the extension/retraction direction of the rod of the actuator and the direction of movement of the sheet cutter are opposite to each other in the preferred embodiments described above, the extension/retraction direction of the rod of the actuator and the direction of movement of the sheet cutter may be the same direction. Alternatively, the extension/retraction direction of the rod of the actuator and the direction of movement of the sheet cutter may be offset by another angle that is not 0 degree or 180 degrees. The method of driving the actuator is not limited to an electromagnetic method, but it may be an air-driven method, for example. The link member may be configured so that the stroke of the sheet cutter is less than or equal to the stroke of the rod. In such a case, the thrust of the sheet cutter is equal to or greater than the axial force of the actuator, which acts favorably with respect to the penetration of the sheet cutter into the medium.

There is no particular limitation on the configuration of other members of the sheet cutter holding device. The components of the sheet cutter holding device shown in the preferred embodiments are not always necessary.

The control of the sheet cutter unit shown in the preferred embodiments is an example, and the control of the sheet cutter unit is not limited thereto. The operation control of the sheet cutter unit is at minimum required to be able to combine moving the sheet cutter in the toward-away direction and moving the sheet cutter unit in the cutting direction to thereby cut the medium, and any additional control is optional. Note that “cutting” as described above may be either perforation or continuous cutting. The “cutting” may involve penetration through the medium or not involve penetration through the medium.

Other preferred embodiments described herein do not limit the present invention, unless otherwise specified.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A processing device comprising:

a support table to support a sheet medium;

a medium transporter to transport the medium supported on the support table in a predetermined transport direction;

a processing head to process the medium supported on the support table;

a sheet cutter that includes a blade portion at a tip to cut the medium;

a cutter holder to hold and move the sheet cutter in a predetermined toward-away direction so as to move the blade portion of the sheet cutter into contact with or away from the medium supported on the support table; and a cutter transporter to move the cutter holder in a cutting direction that is orthogonal to the transport direction; wherein the cutter holder includes:

a holder that is movable in the toward-away direction and that holds the sheet cutter;

an actuator including a rod that extends or retracts;

a link including a first connecting portion connected to the rod and a second connecting portion connected to the holder; and a rotation shaft that rotatably supports the link so that the holder moves in the toward-away direction in response to extension or retraction of the rod.

2. The processing device according to claim 1, wherein a distance between the rotation shaft and the second connecting portion is greater than a distance between the rotation shaft and the first connecting portion.

3. The processing device according to claim 1, wherein the link and the rotation shaft are operable so that the holder moves toward the support table when the rod moves in a predetermined direction, and the holder moves away from the support table when the rod moves in a direction opposite to the predetermined direction;

the actuator is operable to apply an axial force that increases as the rod moves toward a stroke end in the predetermined direction; and the link is elastically deformed by a driving force of the actuator in a state where the actuator is driven to move the rod in the predetermined direction and where the medium prevents the sheet cutter from penetrating the medium.

4. The processing device according to claim 1, wherein the cutter holder further includes:

a biasing portion that biases the holder in such a direction to cause the holder to move away from the support table;

a first portion that holds the holder and the actuator; and a second portion attached to the first member;

the first portion includes a holding section that holds the holder in a first position in the toward-away direction resisting a biasing force of the biasing portion;

the second portion includes a pressing portion that presses the holding section by being attached to the first portion and that deforms the holding section so that the holding section moves away from the holder;

the first position is a position of the holder such that the sheet cutter penetrates the medium supported on the support table; and the holder and the sheet cutter are movable in the toward-away direction as the holding section moves away from the holder.

5. The processing device according to claim 4, wherein the link and the rotation shaft are operable so that the holder moves toward the support table when the rod moves in a predetermined direction, and the holder moves away from the support table when the rod moves in a direction opposite to the predetermined direction;

the actuator is operable to apply an axial force that increases as the rod moves toward a stroke end in the predetermined direction; and the rod is located at the stroke end in the predetermined direction when the holder is located in the first position.

6. The processing device according to claim 5, wherein an extension/retraction direction of the rod is an up-down direction;

the stroke end of the rod in the predetermined direction is an upper stroke end;

the cutter holder includes:

a slide portion capable of adjusting a position of the actuator in the up-down direction in the first portion; and a fixing portion that fixes the position of the actuator that has been adjusted by the slide portion;

the slide portion is operable to allow the actuator to lower by its own weight until the rod is located at the upper stroke end in a state where the holder is located in the first position; and the fixing portion is operable so that a position of the actuator in the first portion is fixable in a state where the holder is located in the first position and the rod is located at the upper stroke end.

7. The processing device according to claim 4, wherein the first portion and the second portion together define a case that accommodates at least the actuator, the link and the rotation shaft as the second portion is attached to the first portion.

8. The processing device according to claim 1, further comprising:

a controller to control the medium transporter, the processing head, the cutter holder and the cutter transporter; wherein the controller includes:

a first sheet-cut control section to continuously cut the medium in the cutting direction; and a second sheet-cut control section to intermittently cut the medium in the cutting direction;

the first sheet-cut control section is operable to perform a first group of steps, including:

a move-toward step of controlling the cutter holder to move the blade portion to a position in the toward-away direction where the medium can be cut; and a first cutting step, after the move-toward step, of controlling the cutter transporter to move the cutter holder at least from one end portion of the medium in the cutting direction to the other end portion;

the second sheet-cut control section is operable to repeatedly perform a second group of steps, including:

a penetration step of controlling the cutter holder to allow the blade portion to penetrate the medium;

a second cutting step, after the penetration step, of controlling the cutter transporter to move the cutter holder in one direction of the cutting direction by a first distance shorter than a length of the medium in the cutting direction;

a move-away step, after the second cutting step, of controlling the cutter holder to move away the blade portion from the medium; and a movement step, after the move-away step, of controlling the cutter transporter to move the cutter holder in the one direction of the cutting direction by a second distance shorter than a length of the medium in the cutting direction.

9. The processing device according to claim 8, wherein the second sheet-cut control section is operable to perform a return step, after the second cutting step and before the move-away step, of controlling the cutter transporter to move the cutter holder in the other direction of the cutting direction by a third distance that is less than or equal to the first distance.

10. The processing device according to claim 8, wherein the controller includes a third sheet-cut control section to repeatedly perform a third group of steps, including:

the penetration step;

a third cutting step, after the penetration step, of controlling the cutter transporter to move the cutter holder in one direction of the cutting direction by a predetermined fourth distance;

the move-away step; and another movement step, after the move-away step, of controlling the cutter transporter to move the cutter holder in the one direction of the cutting direction by a predetermined fifth distance;

a ratio of the fourth distance to the fifth distance is smaller than a ratio of the first distance to the second distance;

the third sheet-cut control section is operable to repeatedly perform the third group of steps on a first end area and a second end area, wherein the first end area is set to a predetermined width extending from one end portion of the medium in the cutting direction toward a central portion, and the second end area is set to a predetermined width extending from the other end portion of the medium in the cutting direction toward the central portion; and the second sheet-cut control section is operable to repeatedly perform the second group of steps on a central area between the first end area and the second end area.

11. The processing device according to claim 8, wherein the second sheet-cut control section is operable to:

perform the first penetration step of the repeated second group of steps so that the blade portion penetrates a place of the medium other than opposite end portions of the medium in the cutting direction; and perform the last second cutting step of the repeated second group of steps so that the step ends at a place of the medium other than the opposite end portions thereof in the cutting direction.

12. The processing device according to claim 8, wherein the controller includes:

a medium information input section to receive a medium width, which is a length of the medium in the cutting direction; and a first distance setting section to set the first distance based on the medium width; wherein the first distance setting section is operable to set the first distance to be shorter as the medium width is shorter.

13. The processing device according to claim 12, wherein the second distance is not dependent on the medium width.

14. The processing device according to claim 12, wherein the controller includes a first registration section in which a number of non-cut portions to be left uncut by the second group of steps and the second distance are registered; and the first distance setting section is operable to set a number of cut portions to be cut by the second group of steps and the first distance so that the number of the non-cut portions and the second distance are equal to the number and length registered in the first registration section based on the medium width input to the medium information input section.

15. The processing device according to claim 14, wherein the medium information input section to receive an input of a type of the medium; and the number of non-cut portions and the second distance are registered in the first registration section for each type of the medium.

16. The processing device according to claim 14, wherein the controller includes a second registration section in which lengths of cut portions at opposite end portions of the medium in the cutting direction are registered;

the second sheet-cut control section is operable to repeatedly perform the second group of steps in an area of the medium between cut portions at opposite end portions of the medium in the cutting direction; and the first distance setting section is operable to calculate the number of cut portions other than cut portions at opposite end portions in the cutting direction and the first distance so that cut portions at opposite end portions in the cutting direction are formed with the lengths registered in the second registration section.

17. The processing device according to claim 16, wherein the lengths of the cut portions at opposite end portions in the cutting direction registered in the second registration section are the same.

18. The processing device according to claim 12, further comprising:

a measuring device to measure the medium width; wherein the medium width measured by the measuring device is input to the medium information input section.

19. The processing device according to claim 8, wherein the processing head is a cutting head including a processing cutter to cut the medium, and a processing cutter holder to hold and move the processing cutter in the toward-away direction to move the processing cutter into contact with or away from the medium on the support table;

the cutter transporter is operable to move the cutting head in the cutting direction;

the controller includes a fourth sheet-cut control section to control the processing cutter holder and the cutter transporter;

the fourth sheet-cut control section is operable to perform:

another move-toward step of controlling the processing cutter holder or the cutter holder to move the processing cutter or the sheet cutter to a position in the toward-away direction at which it is possible to cut a portion of the medium in a thickness direction; and a partial cutting step, after the other move-toward step, of controlling the cutter transporter to move the processing cutter holder or the cutter holder at least from one end portion of the medium in the cutting direction to the other end portion; and the second sheet-cut control section is operable to repeatedly perform the second group of steps along a line along which the partial cutting step has been performed by the fourth sheet-cut control section.

20. The processing device according to claim 1, wherein the processing head is a cutting head including a processing cutter to cut the medium supported on the support table and a processing cutter holder to hold and move the processing cutter in the toward-away direction;

the processing device further comprising:

a carriage to hold the processing head and the cutter holder; and a controller to control the medium transporter, the processing cutter holder, the actuator and the cutter transporter;

the cutter transporter is operable to move the carriage in the cutting direction; and the controller includes a first cutting control section to control the medium transporter, the processing cutter holder and the cutter transporter, to cause the processing cutter to cut the medium based on cut data of processing data.

21. The processing device according to claim 20, wherein the controller includes a second cutting control section to, when the cut data includes cutting of the medium in the cutting direction, control the actuator and the cutter transporter, to cause the sheet cutter to perform at least a portion of the cutting in the cutting direction.

22. The processing device according to claim 1, wherein the processing head is a print head to eject ink toward the medium supported on the support table.

* * * * *